(12) United States Patent
Shin et al.

(10) Patent No.: US 11,150,387 B2
(45) Date of Patent: Oct. 19, 2021

(54) PLANAR METALENS AND COVER GLASS INCLUDING THE SAME

(71) Applicant: Korea Advanced Institute of Science and Technology, Daejeon (KR)

(72) Inventors: Jonghwa Shin, Daejeon (KR); Taeyong Chang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 452 days.

(21) Appl. No.: 16/021,408

(22) Filed: Jun. 28, 2018

(65) Prior Publication Data

US 2019/0049632 A1 Feb. 14, 2019

Related U.S. Application Data

(63) Continuation of application No. PCT/KR2018/004154, filed on Apr. 9, 2018.

(30) Foreign Application Priority Data

Aug. 11, 2017 (KR) .................. 10-2017-0102178
Mar. 2, 2018 (KR) .................. 10-2018-0025367

(51) Int. Cl.
*G02B 3/08* (2006.01)
*G02B 27/42* (2006.01)
*G02B 21/02* (2006.01)
*G02B 1/00* (2006.01)
*G02B 21/34* (2006.01)

(52) U.S. Cl.
CPC .............. *G02B 3/08* (2013.01); *G02B 1/002* (2013.01); *G02B 21/02* (2013.01); *G02B 21/34* (2013.01); *G02B 27/4272* (2013.01); *G02B 27/4277* (2013.01)

(58) Field of Classification Search
CPC .......... G02B 3/08; G02B 1/002; G02B 21/02; G02B 21/34; G02B 27/4272; G02B 27/4277
USPC ......................................................... 359/708
See application file for complete search history.

(56) References Cited

U.S. PATENT DOCUMENTS 10,402,993 B2 * 9/2019 Han ................... G02B 27/1093
2015/0219806 A1 * 8/2015 Arbabi ................. G02B 5/1847
                                                                              359/573

FOREIGN PATENT DOCUMENTS

| JP | H09026752 A | 1/1997 |
|---|---|---|
| JP | 2003090963 A | 3/2003 |
| JP | 2004506919 A | 3/2004 |
| JP | 2006047572 A | 2/2006 |
| JP | 2009128431 A | 6/2009 |
| JP | 5001075 B2 | 8/2012 |
| JP | 2015118227 A | 6/2015 |
| KR | 20160131600 A | 11/2016 |

(Continued)

OTHER PUBLICATIONS

Khorasaninejad et al., "Visible Wavelength Planar Metalenses Based on Titanium Dioxide," IEEE Journal of Selected Topics in Quantum Electronics (May/Jun. 2017); 23(3):4700216 (16 pages).

(Continued)

*Primary Examiner* — Evelyn A Lester
(74) *Attorney, Agent, or Firm* — Fox Rothschild LLP

(57) ABSTRACT

The present disclosure provides a planar metalens and a cover glass including the planar metalens.

18 Claims, 17 Drawing Sheets

(56) References Cited

FOREIGN PATENT DOCUMENTS

KR       101704580 B1     2/2017
WO    2015128657 A1      9/2015

OTHER PUBLICATIONS

Brener et al., "Guiding Light: 3-D metasurfaces with optical possibilities," retrieved from internet (Mar. 13, 2017) (3 pages).
Chen, et al.: "Immersion Meta-Lenses at Visible Wavelengths for Nanoscale Imaging", Nano Letters, Apr. 13, 2017, vol. 17, No. 5, pp. 3188-3194.

* cited by examiner

PLANAR METALENS AND COVER GLASS INCLUDING THE SAME

CROSS-REFERENCE TO RELATED APPLICATION

This application is a continuation of PCT Application No. PCT/KR2018/004154 filed on Apr. 9, 2018, which claims priority to Korean Patent Applications No. 10-2017-0102178 filed on Aug. 11, 2017, and No. 10-2018-0025367 filed on Mar. 2, 2018, in the Korean Intellectual Property Office, the entire disclosures of which are incorporated herein by reference for all purposes.

TECHNICAL FIELD

The present disclosure relates to a planar metalens and a cover glass including the planar metalens.

BACKGROUND

A microscope used to see invisibly small objects has been developed along with scientific technology to complement each other. Particularly, in recent years, an optical microscope has been very widely used for diagnosis and analysis of samples in the fields of life sciences, semiconductor, and the like. However, the optical microscope has the fundamental diffraction limitation and thus cannot distinguish two objects having a center-to-center distance of about 300 nm or less at a wavelength of 500 nm. Considering that a virus has a size of about 100 nm or less and recent semiconductor devices have a minimum linewidth of several ten nm, the diffraction limitation often cannot satisfy the degree of image accuracy required in the field. An electron microscope has high resolution of 1 nm or less but is often unsuitable for observation of organic materials, liquids, or semiconductors, which results in limited use. Therefore, research has been performed in various ways to obtain a more detailed image using an optical microscope by overcoming the light diffraction limitation.

An immersion lens uses oil having a high refractive index as an optical medium. Since a wavelength is decreased in proportion to a refractive index, the immersion lens has an improved resolution up to 200 nm at a wavelength of 500 nm. The immersion lens has been really commercialized and used but has limitations in performance.

Fluorescence labeling such as STED and STORM is a method to observe a sample by labelling the sample with a fluorescent material and has resolution of several ten nm or less, but this method is mainly used for bio samples which can be pretreated with a fluorescent material and is difficult to be widely used and cannot perform instantaneous imaging.

Near-field scanning is a method to closely scan a sample with a probe and thus to obtain micro information using a near field mainly present only within a distance of several hundred nm from a surface of the sample. This method requires an expensive instrument for precisely controlling the probe and takes a long time to obtain an entire image, and, thus, a state of the sample may be changed during scanning and instantaneous imaging cannot be performed.

Further, there has been an attempt to overcome the diffraction limitation using a metamaterial having particular optical properties caused by a regular array of structures smaller than a wavelength. However, it is difficult to construct a three-dimensional array of microstructures and postprocessing using a computer is needed.

Korean Patent No. 10-1704580 discloses a condensing lens and a lithography apparatus using the same.

DISCLOSURE OF THE INVENTION

Problems to be Solved by the Invention

The present disclosure provides a planar metalens and a cover glass including the planar metalens.

However, problems to be solved by the present disclosure are not limited to the above-described problems. Although not described herein, other problems to be solved by the present disclosure can be clearly understood by those skilled in the art from the following description.

Means for Solving the Problems

A first aspect of the present disclosure provides a planar metalens including a first lens including a first planar substrate on one side of which a subject is located, and a first metasurface configured on the other side of the first planar substrate.

A second aspect of the present disclosure provides a cover glass including the planar metalens according to the first aspect of the present disclosure.

Effects of the Invention

According to embodiments of the present disclosure, the planar metalens can implement a super resolution of about 100 nm or less using a material with high refractive index as an optical medium and operate in a label-free manner by using incident light as it is like a normal lens. Further, the planar metalens can spread detailed information of 100 nm or less by a far-field method using diffraction of a Fresnel zone plate expanded to a degree smaller than a wavelength in air and obtain an instantaneous image from the entire field of view and thus enables simple optical high-resolution imaging in the bio and semiconductor fields and in real life. Furthermore, according to embodiments of the present disclosure, a planar metasurface is implemented using a material, such as GaP and Si, which has a high refractive index but whose micro curved surface is not easily processed, and, thus, it is possible to implement a simple form of an optical device which can substitute for existing devices.

The planar metalens according to embodiments of the present disclosure can be manufactured through a mass production process. The planar metalens has a very simple structure and thus can be implemented just by carving the metasurface on one side surface of a semiconductor wafer through an etching process or the like. Considering that a minimum linewidth (about 50 nm) of the metasurface is greater than a minimum linewidth (about 20 nm) of mass-produced D-RAM semiconductors, the planar metalens can be mass-produced using commercial production facilities.

The planar metalens according to embodiments of the present disclosure has a planar shape unlike a conventional lens, and it has a thickness of several ten to 100 □m and is structurally similar to a conventional cover glass. Therefore, the planar metalens is located in contact with a subject without any modification of a conventional optical system to additionally introduce a planar metalens, and, thus, it can be used as a substitution for an existing cover glass. Therefore, the planar metalens can be used as a new concept cover glass that enables observation of a sample (virus or the like) of about 100 nm or less. According to embodiments of the present disclosure, the planar metalens can be manufactured as a cover glass or can be manufactured into a form that can be applied to a mobile phone camera or allows observation with the naked eye, which generally enables super-resolution imaging even in real life.

BRIEF DESCRIPTION OF THE DRAWINGS

FIG. 3A is a schematic diagram illustrating an optical path formed while an image of an object is focused by the planar metalens, FIG. 3B is a schematic diagram of a planar metalens that focuses a real image, and FIG. 3C is a schematic diagram of a planar metalens that focuses a virtual image.

FIG. 4A is a schematic diagram illustrating a part of a structure of a phase-reversing Fresnel zone plate, and FIG. 4B is a schematic diagram illustrating a part of a structure of a Fresnel zone plate with a quarter period.

FIG. 5A shows the case where a first lens is a virtual imaging lens and a second lens is a real imaging lens with $n_1>n_2>n_3=1$, FIG. 5B shows the case where a first lens is a real imaging lens and a second lens is a virtual imaging lens with $n_1>n_2>n_3=1$, and FIG. 5C shows the case where a first lens is a virtual imaging lens and a second lens is a real imaging lens with $n_2=1$ and $n_1>n_3>n_2$. FIG. 5D is a schematic diagram for the same case as in FIG. 5C except that an objective lens is located at a predetermined distance from the second lens.

BEST MODE FOR CARRYING OUT THE INVENTION

Figure 1A:
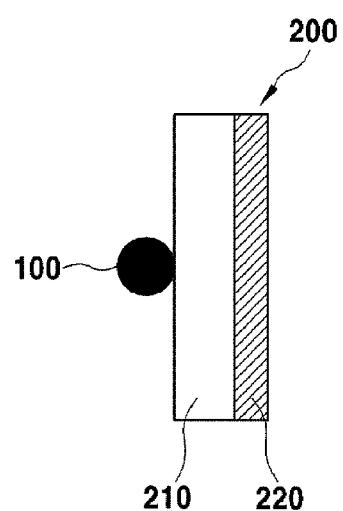
FIGS. 1A and 1B are schematic diagrams of a planar metalens.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "metasurface" refers to a thin film structure formed of a metamaterial and including a predetermined shape or pattern which can control a wavelength band of nanometer-scale light.

Through the whole document, the term "real (virtual) imaging lens" refers to a lens manufactured to make an image of a subject a real (virtual) image when the subject is located on one side of a planar metalens.

A first aspect of the present disclosure provides a planar metalens including a first lens including a first planar substrate on one side of which a subject is located, and a first metasurface configured on the other side of the first planar substrate.

In an embodiment of the present disclosure, the subject can be any target object or material to be observed, but the present disclosure is not limited thereto.

In an embodiment of the present disclosure, if the subject is located on one side of the first planar substrate, the subject can be observed since it is located in contact with the first planar substrate. Specifically, the subject is located in contact with the first planar substrate, light reflected, scattered and/or diffracted from the subject can be incident into the first lens without loss. Therefore, the planar metalens according to an embodiment of the present disclosure can be used as a super-resolution lens which can overcome the diffraction limitation and has a resolution of about 100 nm or less, but may not be limited thereto.

In an embodiment of the present disclosure, the planar metalens may maintain the flatness of its surface before and after the subject is located on one side of the planar metalens, but may not be limited thereto. In an embodiment of the present disclosure, the first lens may be a real imaging lens or virtual imaging lens, but may not be limited thereto.

In an embodiment of the present disclosure, the first lens has a unique focal length and concentrates light transmitting through the first lens on the focus and thus forms an image, but the present disclosure may not be limited thereto.

In an embodiment of the present disclosure, if the first lens is a real imaging lens or a virtual imaging lens, the thickness of an corrugation of a Fresnel zone plate of the first lens, the radius of the Fresnel zone plate, the focal length of the first lens, and the like may be controlled by the following Equation 3, Equation 5, and Equation 7 to control the resolution of the planar metalens, but the present disclosure may not be limited thereto.

In an embodiment of the present disclosure, a refractive index $n_1$ of the first lens of the planar metalens, and a refractive index $n_2$ of an air layer present between the first metasurface and an image plane of the subject may have a correlation of $n_1 > n_2$, but may not be limited thereto.

In an embodiment of the present disclosure, a refractive index $n_1$ of the first lens and a refractive index $n_2$ of an air layer present between the first metasurface and an image plane of the subject have a correlation of $n_1 > n_2$, and, thus, an image may be formed by light collected by the first lens, but the present disclosure may not be limited thereto.

In an embodiment of the present disclosure, the refractive index $n_2$ of the air layer may be about 1, but may not be limited thereto.

In an embodiment of the present disclosure, if the first lens includes GaP, the refractive index of the first lens may be from about 3.3 to about 3.6, and with the use of GaP which is a material with high refractive index, the amount of light having a high spatial frequency component which can be collected by the first lens is increased, and, thus, it is possible to implement high resolution in an appropriate field of view.

In an embodiment of the present disclosure, the first lens may include a material having high refractive index, the material selected from the group consisting of GaP, Si, glass, $SiO_2$, $TiO_2$, ZnO, $Al_2O_3$, AlN, $Si_3N_4$, Ge, $ZrO_2$, SiC, and combinations thereof, but may not be limited thereto.

In an embodiment of the present disclosure, light from a light source may be incident into the subject and then reflected, refracted, diffracted, or scattered by the subject, but may not be limited thereto.

In an embodiment of the present disclosure, the light source may be an HeNe laser having a wavelength of about 532 nm or about 543 nm, but may not be limited thereto.

In an embodiment of the present disclosure, part of the light reflected, refracted, diffracted, or scattered by the subject may transmit the planar metalens, but may not be limited thereto.

In an embodiment of the present disclosure, a wavelength of the light transmitting through the planar metalens may be determined by characteristics of a material with high refractive index forming the first lens, but may not be limited thereto.

In an embodiment of the present disclosure, a wavelength of light transmitting through the planar metalens may be in a range of ultraviolet, visible light, infrared, or near-infrared, but may not be limited thereto.

In an embodiment of the present disclosure, if the wavelength of light transmitting through the planar metalens is in a range of ultraviolet, visible light, infrared, or near-infrared, the first lens may include a material having high refractive index, such as GaP, Si, glass, $SiO_2$, $TiO_2$, ZnO, $Al_2O_3$, AlN, $Si_3N_4$, Ge, $ZrO_2$, or SiC, but may not be limited thereto.

In an embodiment of the present disclosure, the wavelength of light transmitting through the planar metalens may be from about 300 nm to about 1600 nm, but may not be limited thereto.

In an embodiment of the present disclosure, if the first lens includes GaP, the wavelength of light transmitting through the planar metalens may be from about 500 nm to about 1600 nm, but may not be limited thereto.

In an embodiment of the present disclosure, if the first lens includes GaP, the refractive index of the first lens may be from about 3.3 to about 3.6, and the first lens may transmit light in a wavelength band of about 500 nm or more and desirably from about 500 nm to about 600 nm, but may not be limited thereto.

In an embodiment of the present disclosure, the first metasurface may include one or more corrugations, but may not be limited thereto.

In an embodiment of the present disclosure, a thickness of the corrugations of the first metasurface may be about 2 μm or less, but may not be limited thereto.

In an embodiment of the present disclosure, a thickness of the first lens may be about 500 μm or less, but may not be limited thereto.

In an embodiment of the present disclosure, for example, if the first lens includes GaP and has a thickness of more than about 500 μm, a great amount of light in a wavelength band of about 500 nm to about 600 nm of the light incident into the first lens from the subject can be lost, and, thus, the intensity of light forming an image becomes lower than the intensity of the light incident into the first lens and the size of a high spatial frequency component becomes smaller than the size of a low spatial frequency component. Therefore, it may be difficult to observe an image, but the present disclosure may not be limited thereto.

In an embodiment of the present disclosure, the first metasurface may include a diffraction lattice, but may not be limited thereto.

In an embodiment of the present disclosure, the diffraction lattice may include a one-dimensional Fresnel zone plate, a two-dimensional Fresnel zone plate, or a Fresnel zone plate for spatial frequency filter, but may not be limited thereto.

In an embodiment of the present disclosure, the Fresnel zone plate for spatial frequency filter may include some of zones in the one-dimensional Fresnel zone plate or the two-dimensional Fresnel zone plate, but may not be limited thereto. For example, assuming that zones of a Fresnel zone plate are arranged from mth in ascending order of diameter (m is a natural number of from 1 to 1000), the Fresnel zone plate for spatial frequency filter may include only zones corresponding to m of from 500 to 600, but may not be limited thereto.

In an embodiment of the present disclosure, for example, if the Fresnel zone plate is used, light incident into the first lens from the subject may transmit the first metasurface and may also be Fourier transformed at the same time, and, thus, instantaneous imaging can be performed, but the present disclosure may not be limited thereto.

Figure 1B:
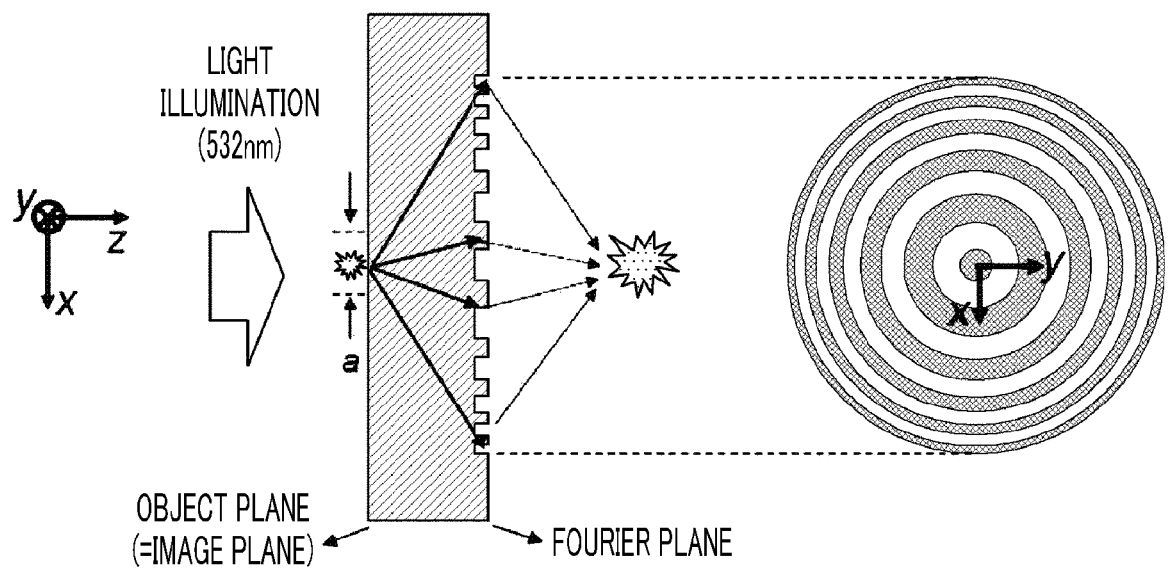
Figure 1C:
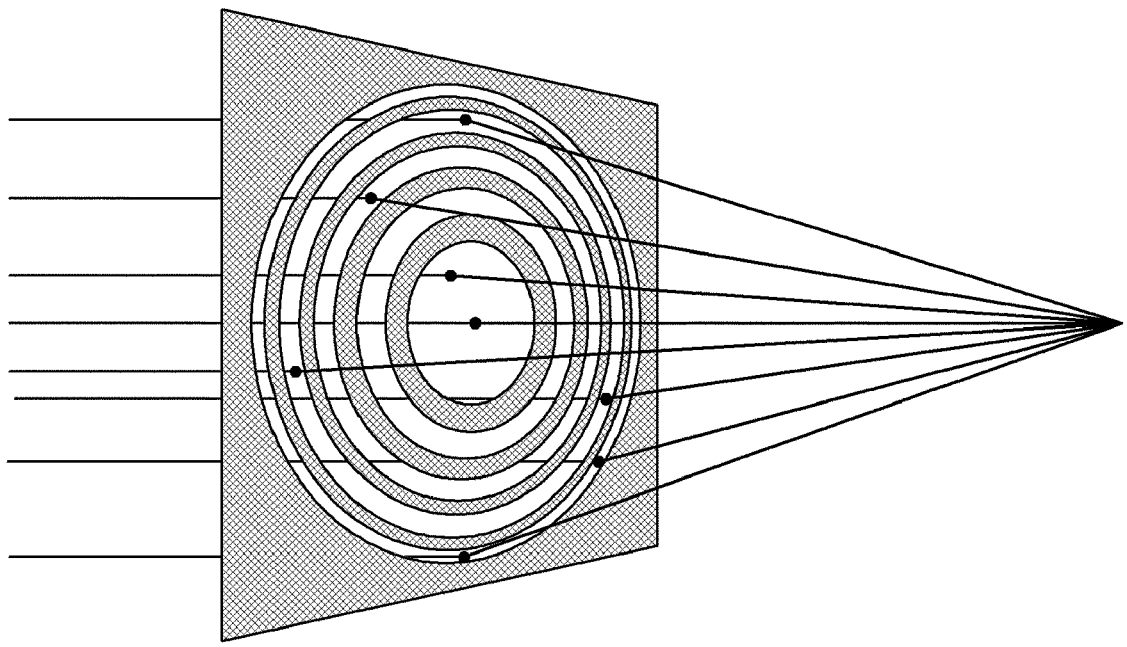
FIG. 1C is a schematic diagram illustrating a shape of a conventional Fresnel zone plate.
Figure 1D:
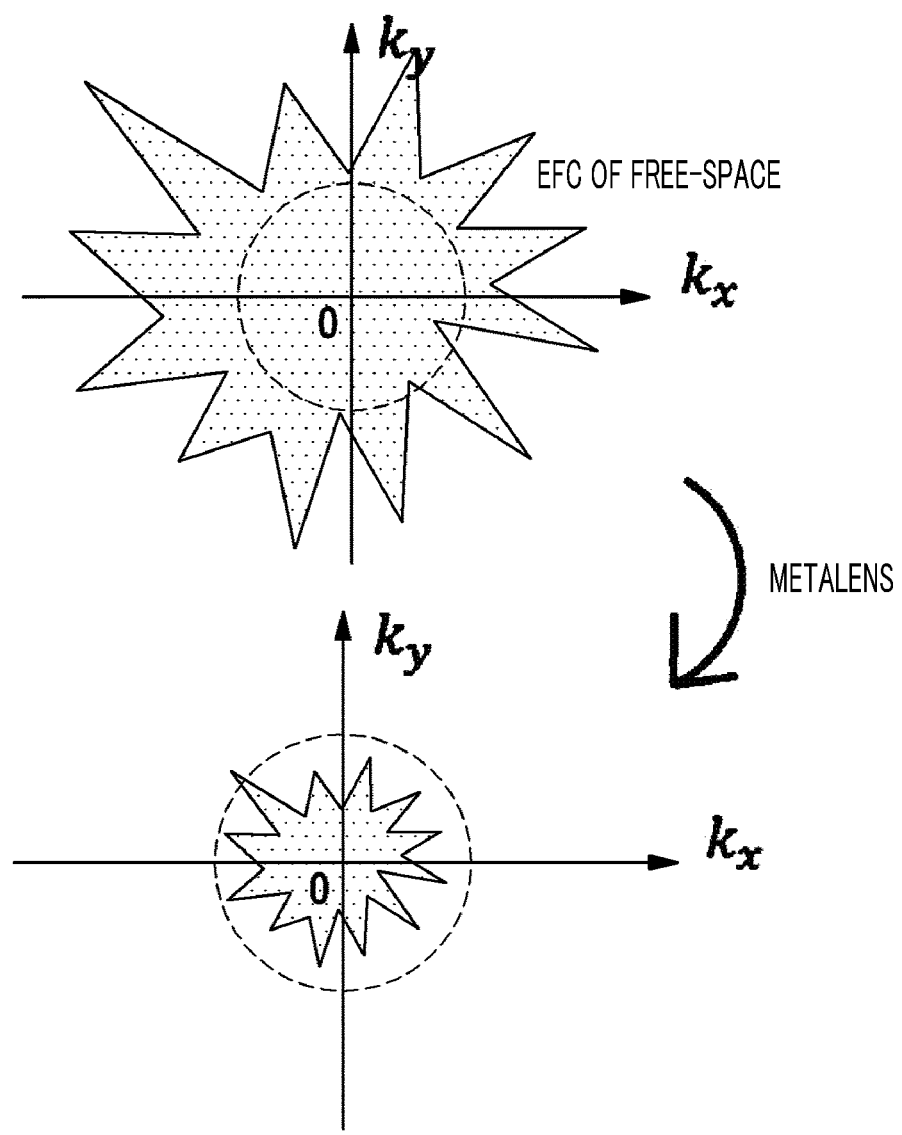
FIG. 1D is a schematic diagram illustrating that a high spatial frequency component can be spread in the air by the planar metalens.

FIGS. 1A and 1B are a schematic diagram of a planar metalens, FIG. 1C is a schematic diagram illustrating a shape of a conventional Fresnel zone plate, and FIG. 1D is a schematic diagram illustrating that a high spatial frequency component can be spread in the air by the planar metalens.

In an embodiment of the present disclosure, the first metasurface may be formed by etching the first planar substrate or by being attached on one side of the first planar substrate, but may not be limited thereto.

In an embodiment of the present disclosure, if the first metasurface is formed by etching the first planar substrate, the first lens may be formed of a single material, but may not be limited thereto.

In an embodiment of the present disclosure, if the first metasurface is formed by being attached on one side of the first planar substrate, the first lens may be formed of two or more materials, but may not be limited thereto.

In an embodiment of the present disclosure, the first lens may have a single-layer, bi-layer or multi-layer structure depending on a method of forming the first metasurface, but may not be limited thereto.

In an embodiment of the present disclosure, if the first metasurface is formed on the first planar substrate by etching, a general etching process commonly used in the lens manufacturing field may be used, and for example, dry etching using a reactive gas, dry etching using plasma, wet etching using an etchant, and the like may be used, but the present disclosure may not be limited thereto.

In an embodiment of the present disclosure, if the first metasurface is formed by being attached on one side of the first planar substrate, for example, lift-off deposition or nano imprinting may be used for attachment, but the present disclosure may not be limited thereto.

In an embodiment of the present disclosure, the lift-off deposition method may include manufacturing a mask pattern by E-beam lithography or the like, depositing a metal or dielectric material to a desired thickness using a sputter or an evaporator, and removing the mask material with a solution such as acetone, but may not be limited thereto.

In an embodiment of the present disclosure, the nano imprinting method may include depositing a metal or dielectric material on a mold for a Fresnel zone plate and depositing a planar material with high refractive material (e.g., GaP) by applying a predetermined pressure and heat thereon, but may not be limited thereto.

In an embodiment of the present disclosure, if the first metasurface is formed by being attached on one side of the first planar substrate, the metasurface may include a metal or a nonmetal, but may not be limited thereto. The metal may be, for example, Zr, Au, Ag, Al, Ti, or Cr, and the nonmetal may be, for example, $Al_2O_3$, AlN, ZnO, Si, $TiO_2$, $Si_3N_4$, or $SiO_2$, but may not be limited thereto.

In an embodiment of the present disclosure, the planar metalens further includes a second lens, and the second lens includes a second planar substrate contacted to the first metasurface on one side thereof, and a second metasurface configured on the other side of the second planar substrate, but may not be limited thereto.

In an embodiment of the present disclosure, the planar metalens includes the second lens in addition to the first lens, and, thus, the first lens and the second lens can offset bends by each other to implement a planar image plane in a wider field of view, but may not be limited thereto.

In an embodiment of the present disclosure, each of the first lens and the second lens may be independently a real imaging lens or virtual imaging lens, but may not be limited thereto.

In an embodiment of the present disclosure, the first lens and the second lens have a unique focal length and concentrate light transmitting through the first lens or the second lens on the focus and thus form an image, but the present disclosure may not be limited thereto.

Figure 5A:
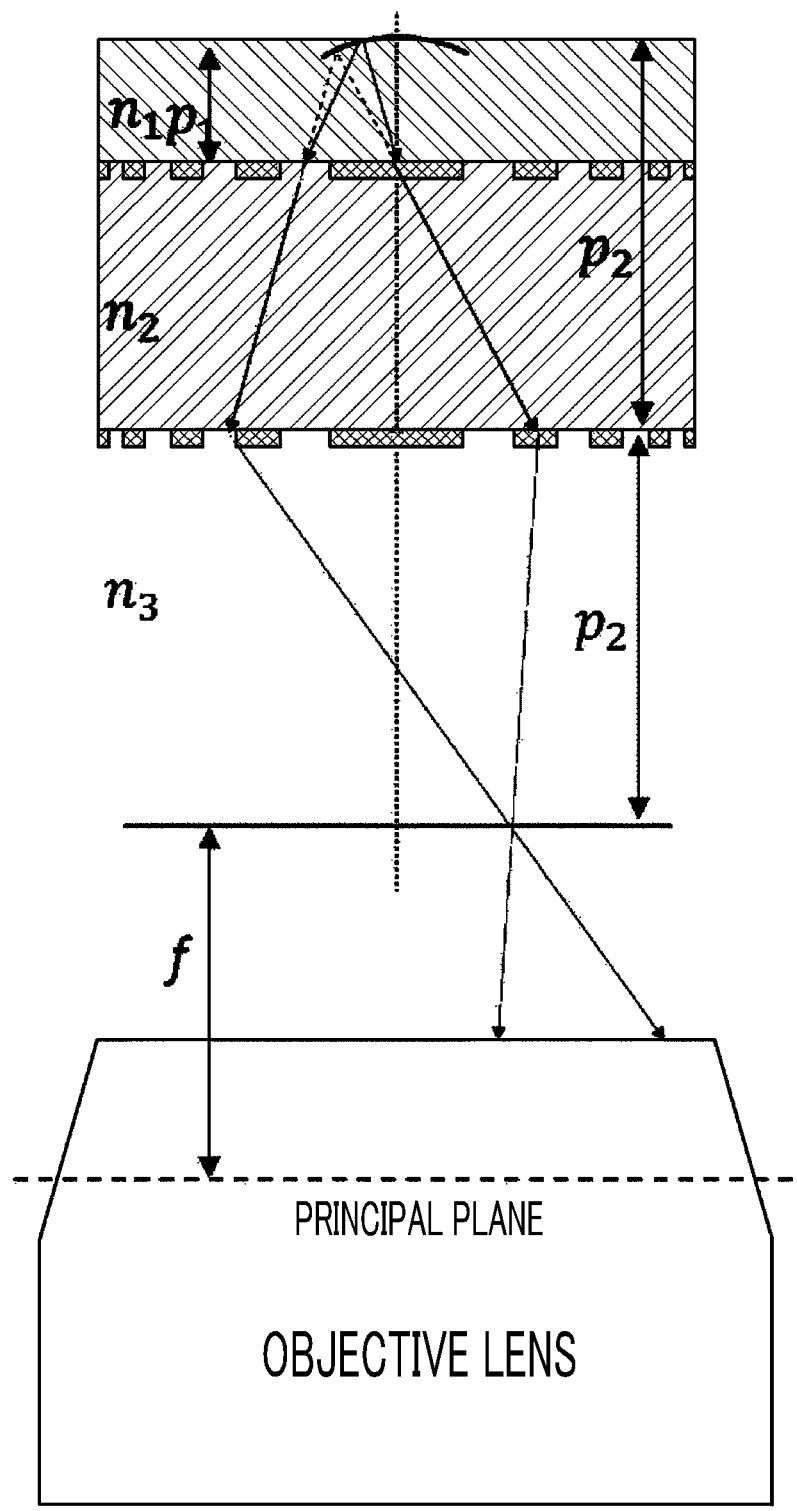
FIGS. 5A, 5B, 5C and 5D provide schematic diagrams illustrating combinations of planar metalenses that implement a planar image plane.
Figure 5B:
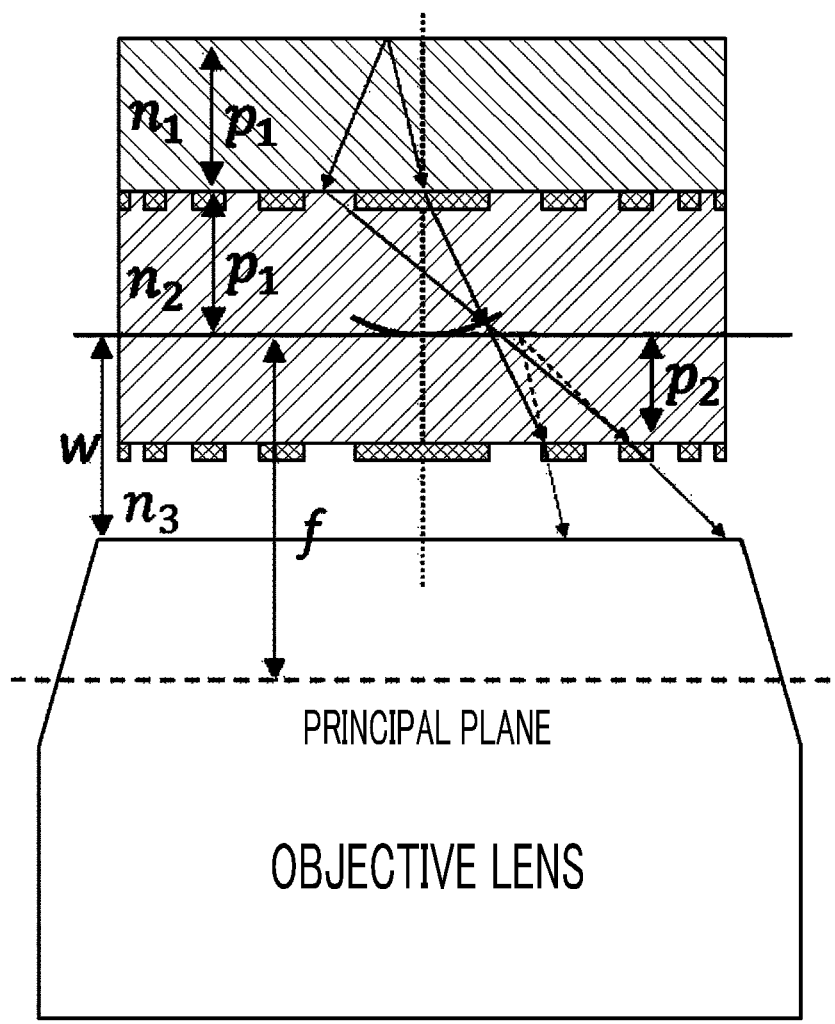

In an embodiment of the present disclosure, for example, FIG. 5A shows the case where the first lens is a virtual imaging lens and the second lens is a real imaging lens, and for example, FIG. 5B shows the case where the first lens is a real imaging lens and the second lens is a virtual imaging lens.

In an embodiment of the present disclosure, in the cases illustrated in FIG. 5A and FIG. 5B, an image plane may become planar, but may not be limited thereto.

In an embodiment of the present disclosure, a refractive index $n_1$ of the first lens, a refractive index $n_2$ of the second lens, and a refractive index $n_3$ of an air layer present between the second metasurface and an image plane of the subject may have a correlation of $n_1 > n_2 > n_3$, but may not be limited thereto.

In an embodiment of the present disclosure, a refractive index $n_1$ of the first lens, a refractive index $n_2$ of the second lens, a refractive index $n_3$ of an air layer present between the second metasurface and an image plane of the subject have a correlation of $n_1 > n_2 > n_3$, and, thus, an image may be formed by light collected by the first lens and the second lens, but the present disclosure may not be limited thereto.

In an embodiment of the present disclosure, the refractive index $n_3$ of the air layer may be about 1, but may not be limited thereto.

In an embodiment of the present disclosure, for example, if the first lens includes GaP, the refractive index $n_1$ of the first lens may be from about 3.3 to about 3.6, and with the use of GaP which is a material with high refractive index, the amount of light having a high spatial frequency component which can be collected by the first lens is increased, and, thus, it is possible to implement high resolution in an appropriate field of view.

In an embodiment of the present disclosure, for example, if the second lens includes glass, the refractive index $n_2$ of the second lens may be from about 1.3 to about 1.6, and since the planar metalens includes the second lens, the amount of light incident into the second lens from the first lens is increased, and, thus, it is possible to set a wider field of view.

In an embodiment of the present disclosure, the first lens may include a material with high refractive index, the material selected from the group consisting of GaP, Si, glass, $SiO_2$, $TiO_2$, ZnO, $Al_2O_3$, AlN, $Si_3N_4$, Ge, $ZrO_2$, SiC, and combinations thereof, and the second lens may include a material selected from the group consisting of polystyrenes, polycarbonates, polymethylmethacrylates, silica aerogel, GaP, Si, glass, $SiO_2$, $TiO_2$, ZnO, $Al_2O_3$, AlN, $Si_3N_4$, Ge, $ZrO_2$, SiC, and combinations thereof, but may not be limited thereto.

In an embodiment of the present disclosure, each of the first lens and the second lens may independently include one or more corrugations, but may not be limited thereto.

In an embodiment of the present disclosure, thicknesses of the corrugations of the first lens and the second lens may be independently about 2 μm or less, but may not be limited thereto.

In an embodiment of the present disclosure, thicknesses of the first lens and the second lens may be independently about 500 μm or less, but may not be limited thereto.

In an embodiment of the present disclosure, if the first lens includes GaP and has a thickness of more than about 500 μm, a great amount of light in a wavelength band of about 500 nm to about 600 nm of the light incident into the first lens from the subject can be lost, and, thus, the intensity of light forming an image becomes lower than the intensity of the light incident into the first lens and the size of a high spatial frequency component becomes smaller than the size of a low spatial frequency component. Therefore, it may be difficult to observe an image, but the present disclosure may not be limited thereto.

In an embodiment of the present disclosure, if the first lens includes GaP and the second lens has a thickness of more than about 500 μm, a great amount of light in a wavelength band of about 500 nm to about 600 nm of the light incident into the second lens from the first lens can be lost, and, thus, the intensity of light forming an image becomes lower than the intensity of the light incident into the second lens and the size of a high spatial frequency component becomes smaller than the size of a low spatial frequency component. Therefore, it may be difficult to observe an image, but the present disclosure may not be limited thereto.

In an embodiment of the present disclosure, each of the first metasurface and the second metasurface may independently include a diffraction lattice, but may not be limited thereto.

In an embodiment of the present disclosure, the diffraction lattice may include a one-dimensional Fresnel zone plate, a two-dimensional Fresnel zone plate, or a Fresnel zone plate for spatial frequency filter, but may not be limited thereto.

In an embodiment of the present disclosure, if the Fresnel zone plate is used in the first lens or the second lens, light incident into the first lens from the subject may transmit the first metasurface and may also be Fourier transformed at the same time and the light transmitting through the first metasurface may transmit the second lens and the second metasurface and may also be Fourier transformed at the same time, and, thus, instantaneous imaging can be performed, but the present disclosure may not be limited thereto.

In an embodiment of the present disclosure, the first metasurface and the second metasurface may be independently formed by etching the first planar substrate and the second planar substrate, respectively, or by being attached on one side of the first planar substrate and the second planar substrate, respectively, but may not be limited thereto.

In an embodiment of the present disclosure, if the first metasurface or the second metasurface is formed by etching the first planar substrate or the second planar substrate, the first lens or the second lens may be formed of a single material, but may not be limited thereto.

In an embodiment of the present disclosure, if the first metasurface or the second metasurface is formed by being attached on one side of the first planar substrate or the second planar substrate, the first lens or the second lens may be formed of two or more materials, but may not be limited thereto.

In an embodiment of the present disclosure, the first lens or the second lens may have a single-layer, bi-layer or multi-layer structure depending on a method of forming the first metasurface or the second metasurface, but may not be limited thereto.

In an embodiment of the present disclosure, if the first metasurface is formed on the first planar substrate by etching, a general etching process commonly used in the lens manufacturing field may be used, and for example, dry etching using a reactive gas, dry etching using plasma, wet etching using an etchant, and the like may be used, but the present disclosure may not be limited thereto.

In an embodiment of the present disclosure, if the first metasurface is formed by being attached on one side of the first planar substrate, for example, lift-off deposition or nano imprinting may be used for attachment, but the present disclosure may not be limited thereto.

In an embodiment of the present disclosure, if the first metasurface is formed by being attached on one side of the first planar substrate, the metasurface may include a metal or a nonmetal, but may not be limited thereto. The metal may be, for example, Zr, Au, Ag, Al, Ti, or Cr, and the nonmetal may be, for example, $Al_2O_3$, AlN, ZnO, Si, $TiO_2$, $Si_3N_4$, or $SiO_2$, but may not be limited thereto.

In an embodiment of the present disclosure, if the second metasurface is formed on the second planar substrate by etching, a general etching process commonly used in the lens manufacturing field may be used, and for example, dry etching using a reactive gas, dry etching using plasma, wet etching using an etchant, and the like may be used, but the present disclosure may not be limited thereto.

In an embodiment of the present disclosure, if the second metasurface is formed by being attached on one side of the second planar substrate, for example, lift-off deposition or nano imprinting may be used for attachment, but the present disclosure may not be limited thereto.

In an embodiment of the present disclosure, if the second metasurface is formed by being attached on one side of the second planar substrate, the metasurface may include a metal or a nonmetal, but may not be limited thereto. The metal may be, for example, Zr, Au, Ag, Al, Ti, or Cr, and the nonmetal may be, for example, $Al_2O_3$, AlN, ZnO, Si, $TiO_2$, $Si_3N_4$, or $SiO_2$, but may not be limited thereto.

In an embodiment of the present disclosure, a wavelength of light transmitting through the planar metalens may be in a range of ultraviolet, visible light, infrared, or near-infrared, but may not be limited thereto.

In an embodiment of the present disclosure, if the wavelength of light transmitting through the planar metalens is in a range of ultraviolet, visible light, infrared, or near-infrared, the first lens may include a material having high refractive index, such as GaP, Si, glass, $SiO_2$, $TiO_2$, ZnO, $Al_2O_3$, AlN, $Si_3N_4$, Ge, $ZrO_2$, or SiC, but may not be limited thereto.

In an embodiment of the present disclosure, the wavelength of light transmitting through the planar metalens may be from about 300 nm to about 1600 nm, but may not be limited thereto.

In an embodiment of the present disclosure, if the first lens includes GaP, the wavelength of light transmitting through the planar metalens may be from about 500 nm to about 1600 nm, but may not be limited thereto.

In an embodiment of the present disclosure, the planar metalens further includes a second lens and an air layer, and the second lens may include a second planar substrate configured apart from the first metasurface and a second metasurface configured on one side of the second planar substrate, and the air layer may be present between the first lens and the second lens, but may not be limited thereto.

In an embodiment of the present disclosure, the planar metalens includes the second lens in addition to the first lens with the air layer interposed therebetween, and, thus, the first lens and the second lens can offset bends by each other to implement a planar image plane in a wider field of view, but may not be limited thereto.

In an embodiment of the present disclosure, the planar metalens may be implemented by arranging the second lens in contact with an objective lens of a microscope or at a certain distance from the objective lens. For example, in the case illustrated in FIG. 5C, the second lens may be in contact with an objective lens of a microscope, or for another example, in the case illustrated in FIG. 5D, the second lens may be arranged at a certain distance from an objective lens of a microscope.

Figure 5C:
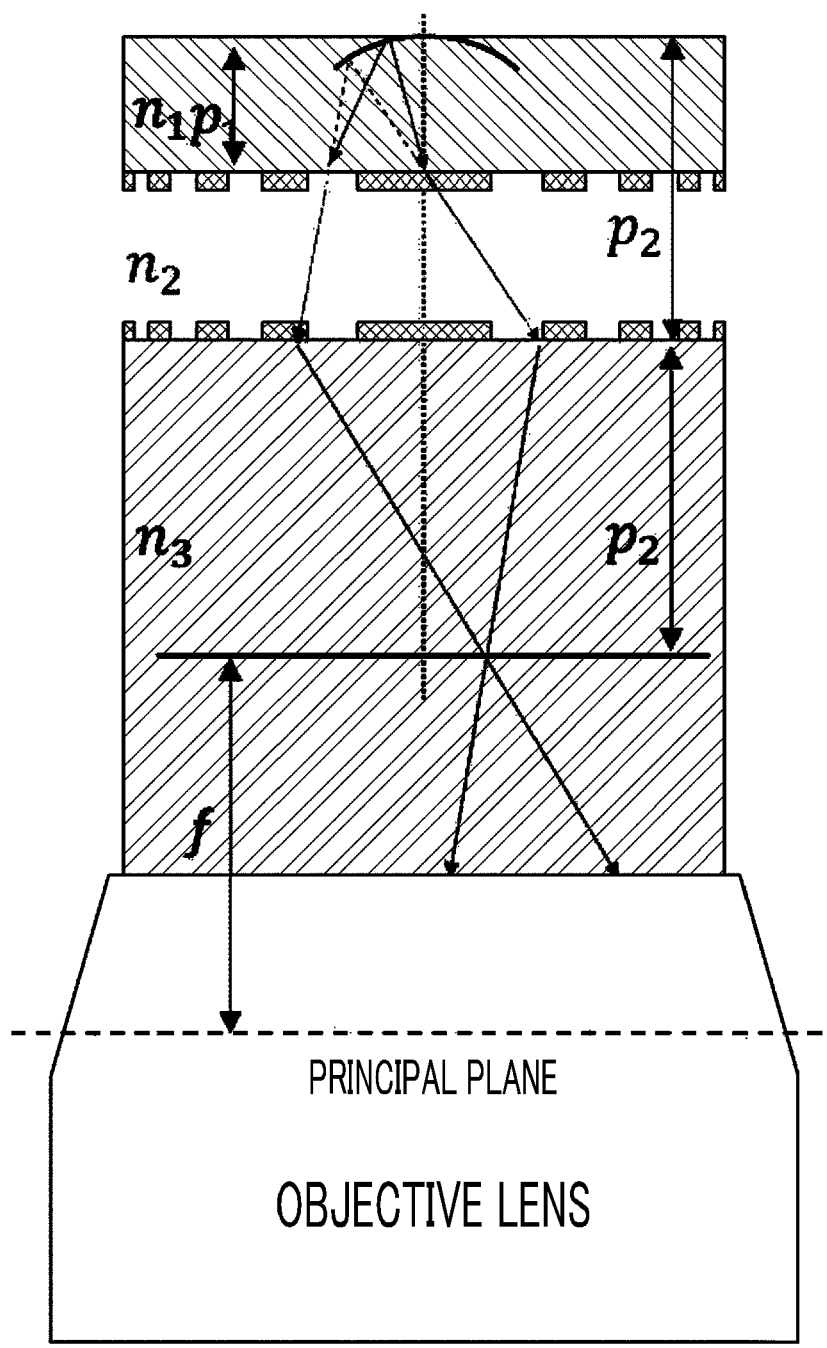
Figure 5D:
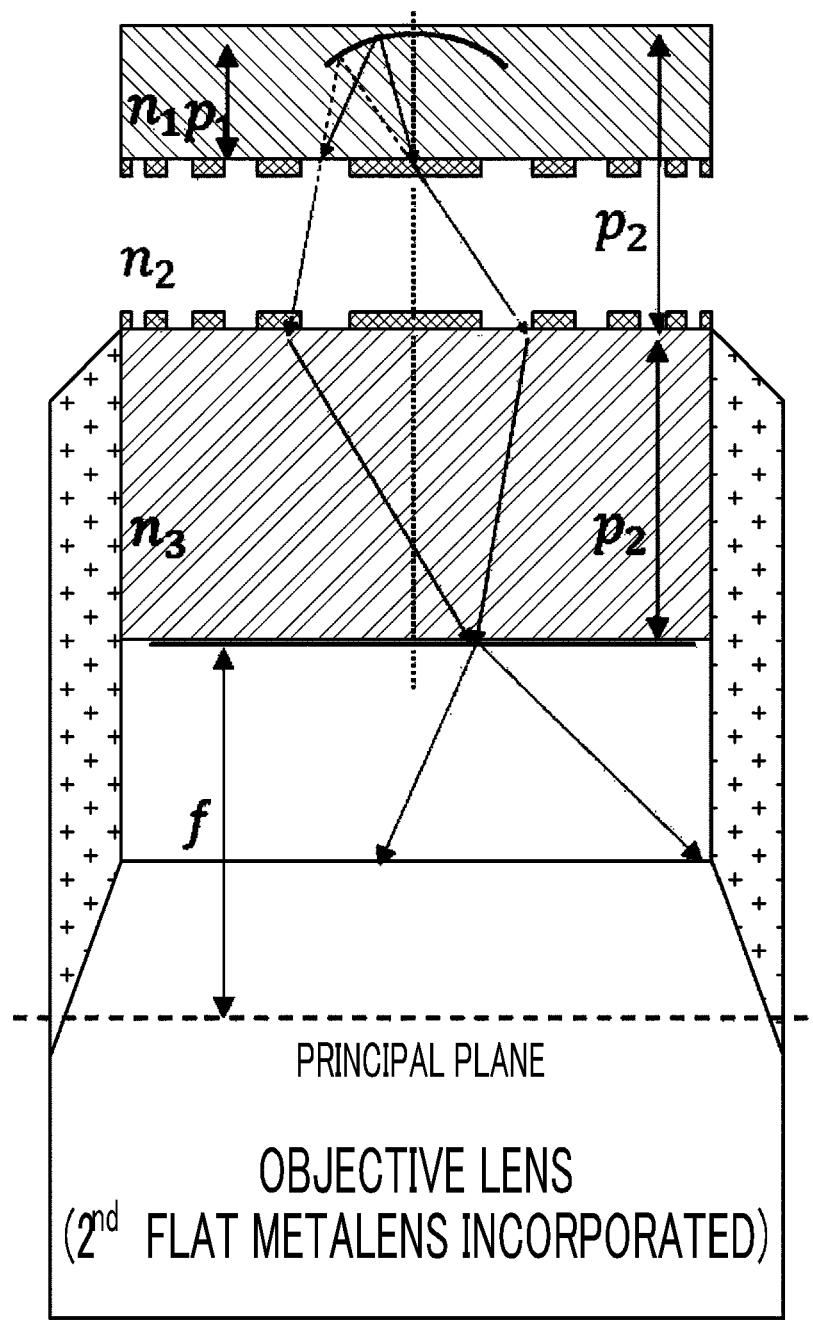

In an embodiment of the present disclosure, for example, in the cases illustrated in FIGS. 5C and 5D, an image plane may become planar, but may not be limited thereto.

In an embodiment of the present disclosure, each of the first lens and the second lens may be independently a real imaging lens or virtual imaging lens, but may not be limited thereto.

In an embodiment of the present disclosure, the first lens and the second lens have a unique focal length and concentrate light transmitting through the first lens or the second lens on the focus and thus form an image, but the present disclosure may not be limited thereto.

In an embodiment of the present disclosure, for example, FIG. 5C shows the case where the first lens is a virtual imaging lens and the second lens is a real imaging lens, but may not be limited thereto.

In an embodiment of the present disclosure, for example, if the first lens is a virtual imaging lens and the second lens is a real imaging lens as illustrated in FIG. 5C, bends can be offset by each other, and, thus, an image plane may become planar, but may not be limited thereto.

In an embodiment of the present disclosure, a refractive index $n_1$ of the first lens, a refractive index $n_2$ of the air layer, and a refractive index $n_3$ of the second lens may have a correlation of $n_1 > n_3 > n_2$, but may not be limited thereto.

In an embodiment of the present disclosure, a refractive index $n_1$ of the first lens, a refractive index $n_2$ of the air layer, and a refractive index $n_3$ of the second lens have a correlation of $n_1 > n_3 > n_2$, and, thus, an image may be formed by light collected by the first lens and the second lens, but the present disclosure may not be limited thereto.

In an embodiment of the present disclosure, the refractive index $n_2$ of the air layer may be about 1, but may not be limited thereto.

In an embodiment of the present disclosure, for example, if the first lens includes GaP, the refractive index $n_1$ of the first lens may be from about 3.3 to about 3.6, and with the use of GaP which is a material with high refractive index, the amount of light having a high spatial frequency component which can be collected by the first lens is increased, and, thus, it is possible to implement high resolution in an appropriate field of view.

In an embodiment of the present disclosure, for example, if the second lens includes glass, the refractive index $n_3$ of the second lens may be from about 1.3 to about 1.6, and since the planar metalens includes the second lens, the first lens and the second lens can offset bends by each other to implement a planar image plane.

In an embodiment of the present disclosure, the first lens may include a material having high refractive index, the material selected from the group consisting of GaP, Si, glass, $SiO_2$, $TiO_2$, ZnO, $Al_2O_3$, AlN, $Si_3N_4$, Ge, $ZrO_2$, SiC, and combinations thereof, and the second lens may include a material selected from the group consisting of polystyrenes, polycarbonates, polymethylmethacrylates, silica aerogel, GaP, Si, glass, $SiO_2$, $TiO_2$, ZnO, $Al_2O_3$, AlN, $Si_3N_4$, Ge, $ZrO_2$, SiC, and combinations thereof, but may not be limited thereto.

In an embodiment of the present disclosure, each of the first lens and the second lens may independently include one or more corrugations, but may not be limited thereto.

In an embodiment of the present disclosure, thicknesses of the corrugations of the first lens and the second lens may be independently about 2 μm or less, but may not be limited thereto.

In an embodiment of the present disclosure, thicknesses of the first lens and the second lens may be independently about 500 μm or less, but may not be limited thereto.

In an embodiment of the present disclosure, if the first lens includes GaP and has a thickness of more than about 500 μm, a great amount of light in a wavelength band of about 500 nm to about 600 nm of the light incident into the first lens from the subject can be lost, and the intensity of light forming an image becomes lower than the intensity of the light incident into the first lens and the size of a high spatial frequency component becomes smaller than the size of a low spatial frequency component. Therefore, it may be difficult to observe an image, but the present disclosure may not be limited thereto.

In an embodiment of the present disclosure, if the first lens includes GaP and the second lens has a thickness of more than about 500 μm, a great amount of light in a wavelength band of about 500 nm to about 600 nm of the light incident into the second lens from the first lens can be lost, and, thus, the intensity of light forming an image becomes lower than the intensity of the light incident into the second lens and the size of a high spatial frequency component becomes smaller than the size of a low spatial frequency component. Therefore, it may be difficult to observe an image, but the present disclosure may not be limited thereto.

In an embodiment of the present disclosure, each of the first metasurface and the second metasurface may independently include a diffraction lattice, but may not be limited thereto.

In an embodiment of the present disclosure, the diffraction lattice may include a one-dimensional Fresnel zone plate, a two-dimensional Fresnel zone plate, or a Fresnel zone plate for spatial frequency filter, but may not be limited thereto.

In an embodiment of the present disclosure, if the Fresnel zone plate is used in the first lens or the second lens, light incident into the first lens from the subject may transmit the first metasurface and may also be Fourier transformed at the same time and the light transmitting through the first metasurface may transmit the second lens and the second metasurface and may also be Fourier transformed at the same time, and, thus, instantaneous imaging can be performed, but the present disclosure may not be limited thereto.

In an embodiment of the present disclosure, the first metasurface and the second metasurface may be formed by etching the first planar substrate and the second planar substrate, respectively, or by being attached on one side of the first planar substrate and the second planar substrate, respectively, but may not be limited thereto.

In an embodiment of the present disclosure, if the first metasurface or the second metasurface is formed by etching the first planar substrate or the second planar substrate, the first lens or the second lens may be formed of a single material, but may not be limited thereto.

In an embodiment of the present disclosure, if the first metasurface or the second metasurface is formed by being attached on one side of the first planar substrate or the second planar substrate, the first lens or the second lens may be formed of two or more materials, but may not be limited thereto.

In an embodiment of the present disclosure, the first lens or the second lens may have a single-layer, bi-layer or multi-layer structure depending on a method of forming the first metasurface or the second metasurface, but may not be limited thereto.

In an embodiment of the present disclosure, if the first metasurface is formed on the first planar substrate by etching, a general etching process commonly used in the lens manufacturing field may be used, and for example, dry etching using a reactive gas, dry etching using plasma, wet etching using an etchant, and the like may be used, but the present disclosure may not be limited thereto.

In an embodiment of the present disclosure, if the first metasurface is formed by being attached on one side of the first planar substrate, for example, lift-off deposition or nano imprinting may be used for attachment, but the present disclosure may not be limited thereto.

In an embodiment of the present disclosure, if the first metasurface is formed by being attached on one side of the first planar substrate, the metasurface may include a metal or a nonmetal, but may not be limited thereto. The metal may be, for example, Zr, Au, Ag, Al, Ti, or Cr, and the nonmetal may be, for example, $Al_2O_3$, AlN, ZnO, Si, $TiO_2$, $Si_3N_4$, or $SiO_2$, but may not be limited thereto.

In an embodiment of the present disclosure, if the second metasurface is formed on the second planar substrate by etching, a general etching process commonly used in the lens manufacturing field may be used, and for example, dry etching using a reactive gas, dry etching using plasma, wet etching using an etchant, and the like may be used, but the present disclosure may not be limited thereto.

In an embodiment of the present disclosure, if the second metasurface is formed by being attached on one side of the second planar substrate, for example, lift-off deposition or nano imprinting may be used for attachment, but the present disclosure may not be limited thereto.

In an embodiment of the present disclosure, if the second metasurface is formed by being attached on one side of the second planar substrate, the metasurface may include a metal or a nonmetal, but may not be limited thereto. The metal may be, for example, Zr, Au, Ag, Al, Ti, or Cr, and the nonmetal may be, for example, $Al_2O_3$, AlN, ZnO, Si, $TiO_2$, $Si_3N_4$, or $SiO_2$, but may not be limited thereto.

In an embodiment of the present disclosure, a wavelength of light transmitting through the planar metalens may be in a range of ultraviolet, visible light, infrared, or near-infrared, but may not be limited thereto.

In an embodiment of the present disclosure, if the wavelength of light transmitting through the planar metalens is in a range of ultraviolet, visible light, infrared, or near-infrared, the first lens may include a material having high refractive index, such as GaP, Si, glass, $SiO_2$, $TiO_2$, ZnO, $Al_2O_3$, AlN, $Si_3N_4$, Ge, $ZrO_2$, or SiC, but may not be limited thereto.

In an embodiment of the present disclosure, the wavelength of light transmitting through the planar metalens may be from about 300 nm to about 1600 nm, but may not be limited thereto.

In an embodiment of the present disclosure, if the first lens includes GaP, the wavelength of light transmitting through the planar metalens may be from about 500 nm to about 1600 nm, but may not be limited thereto.

A second aspect of the present disclosure provides a cover glass including the planar metalens according to the first aspect of the present disclosure.

Figure 2:
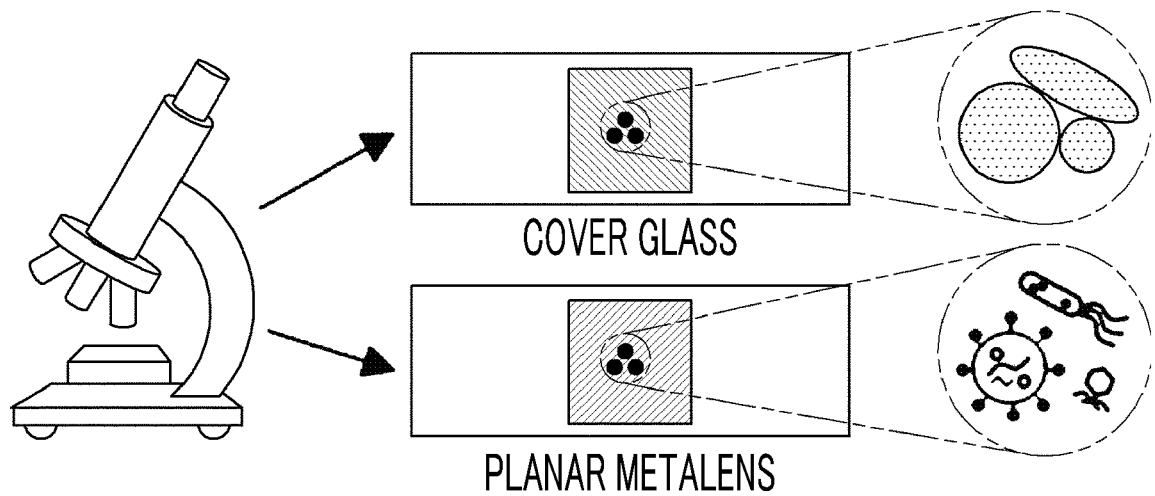
FIG. 2 is a conceptual diagram showing the use of a planar metalens formed into a cover glass.

FIG. 2 is a conceptual diagram showing the use of a planar metalens formed into a cover glass in accordance with an embodiment of the present disclosure.

All the descriptions of the planar metalens in accordance with the first aspect of the present disclosure can be applied to the cover glass in accordance with the second aspect of the present disclosure, and the omission of the descriptions in the second aspect of the present disclosure does not mean to exclude the application of the descriptions to the second aspect of the present disclosure.

In an embodiment of the present disclosure, the planar metalens can instantaneously Fourier transform light irradiated to a subject from a light source and then reflected, refracted, diffracted or scattered from the subject with the Fresnel zone plate and thus can perform imaging in real time. Therefore, it can be used as a cover glass and an observer can observe the subject with the naked eye through an objective lens of a commercial microscope after covering the subject with the cover glass.

In an embodiment of the present disclosure, for example, the planar metalens itself may be used as the cover glass, but may not be limited thereto.

According to embodiments of the present disclosure, the planar metalens can implement a super resolution of about 100 nm or less using a material with high refractive index as an optical medium and operate in a label-free manner by using incident light as it is like a normal lens. Further, the planar metalens can spread detailed information of 100 nm or less by a far-field method using diffraction of a Fresnel zone plate expanded to a degree smaller than a wavelength in air and obtain an instantaneous image from the entire field of view and thus enables simple optical high-resolution imaging in the bio and semiconductor fields and in real life. Furthermore, according to embodiments of the present disclosure, a planar metasurface is implemented using a material, such as GaP and Si, which has a high refractive index but whose micro curved surface cannot be processed, and, thus, it is possible to implement a simple form of an optical device which can substitute for existing devices.

According to embodiments of the present disclosure, the planar metalens can be manufactured through a mass production process. The planar metalens has a very simple structure and thus can be implemented just by carving the metasurface on one side surface of a semiconductor wafer through an etching process or the like. Considering that a minimum linewidth (about 50 nm) of the metasurface is greater than a minimum linewidth (about 20 nm) of mass-produced D-RAM semiconductors, the planar metalens can be mass-produced using commercial production facilities.

According to embodiments of the present disclosure, the planar metalens has a planar shape unlike a conventional lens, and it has a thickness of several ten to 100 □m and is structurally similar to a conventional cover glass. Therefore, the planar metalens is located in contact with a subject without any modification of a conventional optical system to additionally introduce a planar metalens, and, thus, it can be used as a substitution for an existing cover glass. Therefore, the planar metalens can be used as a new concept cover glass that enables observation of a sample (virus or the like) of about 100 nm or less. Further, the planar metalens can be manufactured as a cover glass or can be manufactured into a form that can be applied to a mobile phone camera or allows observation with the naked eye, which generally enables super-resolution imaging even in real life.

Hereinafter, embodiments and Examples of the present disclosure will be explained in more detail with reference to the drawings. However, the present disclosure is not limited to the following embodiments.

Principle of Planar Metalens

FIGS. 1A and 1B is a schematic diagram of a planar metalens in accordance with an embodiment of the present disclosure, FIG. 1C illustrates a shape of a conventional Fresnel zone plate, and FIG. 1D illustrates that a high spatial frequency component can be spread in the air by the planar metalens.

A planar metalens has a very simple structure formed by etching a metasurface (e.g., Fresnel zone plate) on one side of a solid medium having a predetermined thickness through an etching process or the like. The principle of the planar metalens is to combine a solid immersion lens (immersion lens in which a solid material serves as oil) with a Fresnel zone plate. A schematic diagram of the planar metalens is shown in FIGS. 1A and 1B. With regard to FIG. 1A, 100 is a subject or object to be observed, 200 is a flat metalens, 210 is a first flat plate, and 220 is a first metasurface. Firstly, an object to be observed as being in contact with an object plane receives light and the light is scattered and spread to a solid medium. In this case, the solid medium has high refractive index like an immersion lens or a solid immersion lens, and, thus, a high spatial frequency component can also be spread to an substrate with a specific angle to reach an interface (Fourier plane) spaced with a distance of "d" in a z-axis direction on the other side. If Fresnel conditions are satisfied by limiting a field of view of the planar metalens, the object plane and the Fourier plane may have an approximate Fourier transform relationship. Therefore, light reaching the Fourier plane may have a different spatial frequency component depending on a space. However, since the light is still present in the medium with high refractive index, information having a high spatial frequency component cannot get out into the air (upper side of FIG. 1D). The spatial frequency component on the Fourier plane within the solid medium is as shown below.

$$k_x(r) = nk_o \frac{r}{\sqrt{d^2+r^2}}$$

$r = \sqrt{x^2+y^2}$, $n$: Refractive index of solid medium

In this case, the light may be diffracted by the Fresnel zone plate positioned on the Fourier plane, and in this case, a spatial frequency component applied to the Fresnel zone plate is as shown below.

$$k_G(r) = (n+1)k_o \frac{r}{\sqrt{d^2+r^2}}$$

A different spatial frequency component is applied depending on a space in the same manner as in the conventional Fresnel zone plate (FIG. 1C), but in this case, a zone having a thickness and a distance smaller several times than a wavelength in the air is used to correspond to a refractive index of the solid medium. Such a Fresnel zone plate is implemented on the Fourier plane which becomes a metasurface. A spatial frequency component of light diffracted by the Fresnel zone plate is as shown below.

$$k_x(r) = -k_o \frac{r}{\sqrt{d^2+r^2}}$$

Therefore, the spatial frequency component becomes smaller than a maximum spatial frequency component $k_O$ which can be spread in the air and all information can be spread to the original substrate without aliasing (lower side in FIG. 1D). Through the above-described process, an increased resolution to be instantaneously implemented on the original substrate in a label-free manner can be obtained from a two-dimensionally patterned planar metalens. Although there has been described an example where $k_G(r)$ enables an image of an object to be primarily focused in the air spaced with a distance of "d" from the Fourier plane, a location where the image is focused can be adjusted from in front of the Fourier plane to infinity by controlling a distance of the Fresnel zone plate to thus control $k_G(r)$.

The performance of the planar metalens is directly affected by a refractive index and a loss rate of the solid medium. In case of GaP(Gallium Phosphide) which has a high refractive index and a low loss rate for a visible light, the performance of the planar metalens can be expected as described below. At a wavelength of 500 nm, a refractive index of GaP is 3.6 and an extinction coefficient is 0.0056. In this case, a maximum resolution is about 85 nm and if a maximum viewing angle is limited to 75 degrees, the resolution reaches about 88 nm. A field of view of the planar metalens can be calculated with the condition that the object plane and the Fourier plane need to satisfy a Fresnel condition to have an approximate Fourier transform relationship. The Fresnel condition is as shown below.

$$N_p \frac{\theta_m^2}{4} = \frac{a^2}{d\lambda} \cdot \frac{\theta_m^2}{4} \ll 1$$

Assuming that a maximum viewing angle is $\Theta_m$ is 75 degrees, a wavelength $\lambda$ is 500 nm and a maximum thickness d considering loss is 10 μm, a field of view is about 1×1 μm². Assuming that a wavelength is 532 nm, GaP has small light loss, and, thus, the planar metalens can be manufactured large and may have a resolution of about 96 nm and a field of view of about 5×5 μm².

FIG. 2 is a conceptual diagram showing the use of a planar metalens formed into a cover glass in accordance with an embodiment of the present disclosure.

As for an additional function of the planar metalens, a lens using light refraction such as a conventional solid immersion lens changes in focal length, field of view, and the like depending on a shape of a curved surface of the lens. In this case, it is difficult to implement a curved surface of the lens as precisely as desired, and even a solid immersion lens formed a metal material uses a natural curved surface. However, the planar metalens designed in the present disclosure uses a two-dimensional metasurface, and, thus, it is possible to design and manufacture a focal length, a field of view, and the like as desired just by modifying a surface structure. The planar metalens designed in the present disclosure can be used as a spatial frequency filter that obtains only a specific spatial frequency component, a one-way imaging device using a one-dimensional Fresnel zone plate, or the like.

Figure 3A:
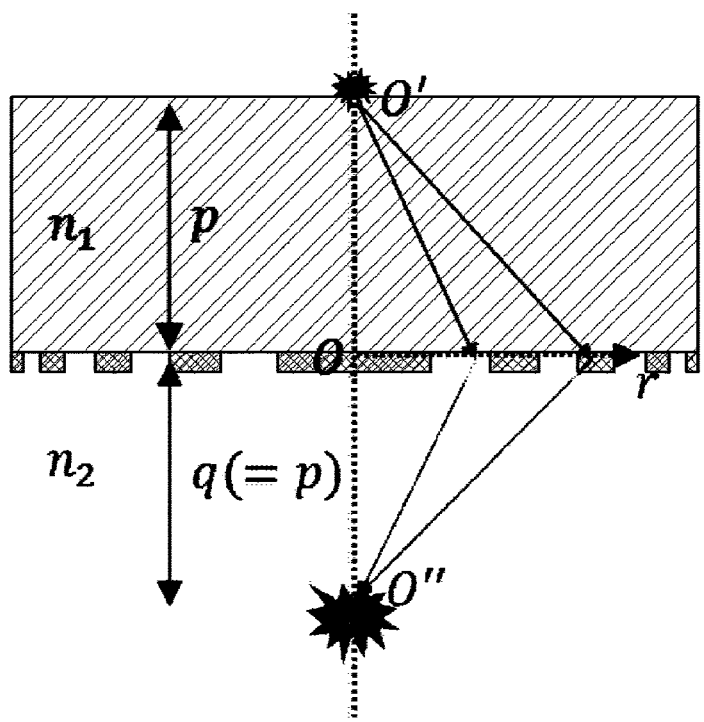
FIGS. 3A, 3B and 3C provide schematic diagrams illustrating a planar metalens and an optical path in the planar metalens.
Figure 3B:
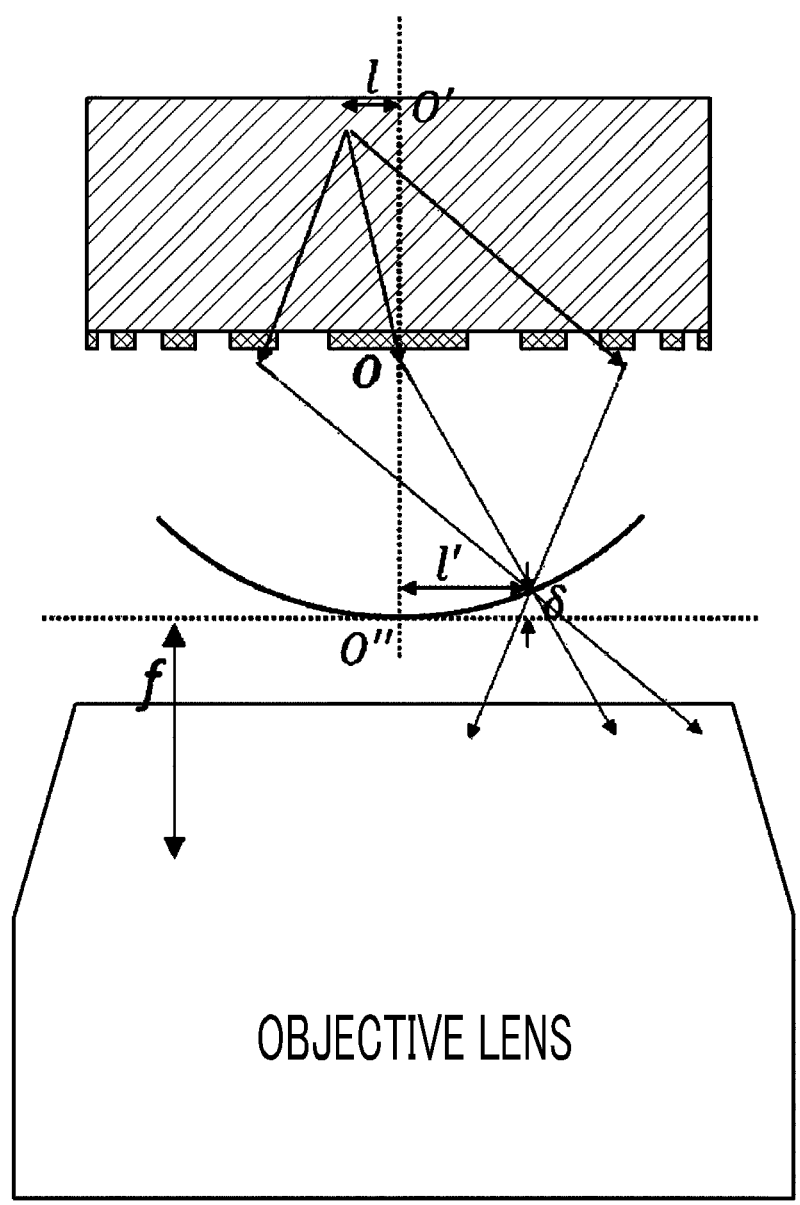
Figure 3C:
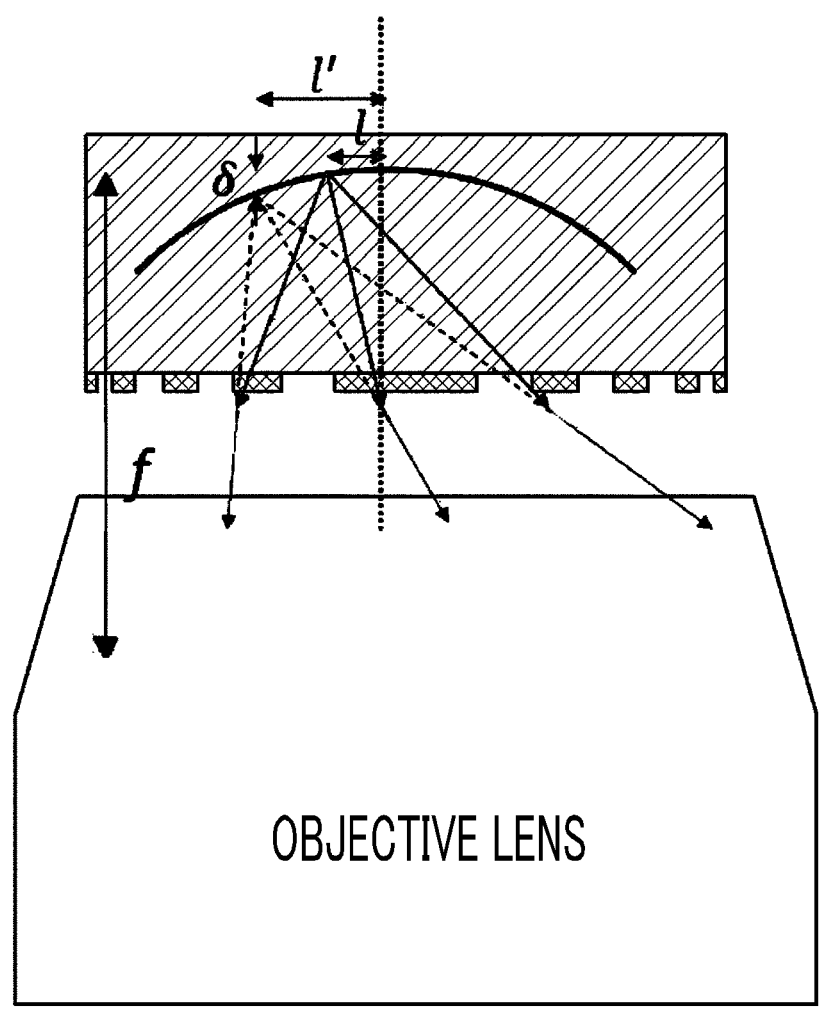

FIGS. 3A-3C provide schematic diagrams illustrating a planar metalens and an optical path in the planar metalens in accordance with an embodiment of the present disclosure, FIG. 3A is a schematic diagram illustrating an optical path formed while an image of an object is focused by the planar metalens, FIG. 3B is a schematic diagram of a planar metalens that focuses a real image, and FIG. 3C is a schematic diagram of a planar metalens that focuses a virtual image.

The design of a metasurface of the planar metalens illustrated in FIGS. 3A-3C can be obtained with the condition that lights coming out from an object in different directions should have the same phase when forming an image (FIG. 3A) (Calculation of optical path difference). Although FIGS. 3A-3C illustrates a two-dimensional planar surface, r can be established for any azimuth on a three-dimensional planar surface of the metasurface and thus can be immediately applied to a three-dimensional space.

Firstly, if an image of an object at an origin O' on an objective plane is focused at an origin O'' on an image plane, calculation may be carried out as follows. It may be assumed that a distance between the object and the metasurface is p, a distance between the image and the metasurface is q, a refractive index of a material (with high refractive index) from the objective plane to the metasurface is $n_1$, and a refractive index of a material on the other side is $n_2$. In this case, a phase $\Phi(r)$ applied to light from the metasurface spaced with a distance of r from an origin O needs to satisfy the following condition in order for lights coming out from the object in different directions to have the same phase.

$$\phi(r) = \frac{2\pi}{\lambda}\left(-n_1\sqrt{r^2+p^2} - n_2\sqrt{r^2+q^2} + n_1 p + n_2 q\right) \quad \text{[Equation 1]}$$

The above-described condition is a condition for a spherical aberration-free metasurface. If an image of the object spaced laterally from an origin is focused through the above metasurface, calculation of an optical path difference may be carried out as follows (FIG. 3B). Assuming that a distance between the object and the origin of the objective plane is l, a distance between the image and the origin of the image plane is l', and a vertical distance between the image and the origin of the image plane is δ (bend of the image plane), the optical path difference (OPD) is as follows.

$$OPD = \frac{2\pi}{\lambda}\left[n_1\sqrt{(r+l)^2+p^2} + n_2\sqrt{(r-l')^2+(q+\delta)^2} - n_1\sqrt{l^2+p^2} - n_2\sqrt{l'^2+(q+\delta)^2} + \phi(r)\right] \quad \text{[Equation 2]}$$

Even in this case, an absolute value of the OPD needs to be minimum regardless of r and l in order for the image to be precisely focused. A residual OPD that does not become 0 represents various aberrations. If Equation 2 is approximated by substituting Equation 1 into Equation 2 with the condition that l is very smaller than p and δ is very smaller than l/p, a condition for minimum OPD is p=q (free of first-order coma; Coma: Aberration for an image of an object spaced laterally from an origin) and a bend δ of the image plane for minimum OPD is represented by $$\delta = \frac{l'^2}{2p}\left(1 + \frac{n_2}{n_1}\right)(1+\beta).$$

Herein, β is a function for r but can be regarded as about 1 and generates a high-order coma.

The above-described method can also be applied to a planar metalens that forms a virtual image (FIG. 3C). Therefore, a condition for a metalens that forms a spherical aberration- and first-order coma-free real image is as shown in Equation 3.

$$\phi(r) = -\frac{2\pi}{\lambda}(n_1 + n_2)(\sqrt{r^2+p^2} - p) \quad \text{[Equation 3]}$$

In this case, a bend of the image plane is represented by Equation 4.

$$\delta = \frac{l'^2}{p}\left(1 + \frac{n_2}{n_1}\right) \quad \text{[Equation 4]}$$

Further, a condition for a metalens that forms a spherical aberration- and first-order coma-free virtual image is as shown in Equation 5.

$$\phi(r) = -\frac{2\pi}{\lambda}(n_1 - n_2)(\sqrt{r^2+p^2} - p) \quad \text{[Equation 5]}$$

In this case, a bend of the image plane is represented by Equation 6.

$$\delta = -\frac{l'^2}{p}\left(1 - \frac{n_2}{n_1}\right) \quad \text{[Equation 6]}$$

Implementation of Planar Metalens

Any structure that satisfies Equation 3 and Equation 5 can be a metasurface of a planar metalens. Examples thereof may include a Fresnel lens, various orders of Fresnel zone plates, and the like. Further, if the above equation is slightly modified, it can also be applied to a hemispheric solid immersion lens.

A Fresnel zone plate diffracts or refracts light by controlling a phase of the light through an corrugation having a specific form on the basis that light has a phase difference when passing a specific distance through materials having different refractive indexes. Firstly, a first-order or high-order phase reversing Fresnel zone plate has a simple structure. In this case, an corrugation is formed whenever a phase of a metasurface has a difference of aπ (a=odd number: 1, 3, 5 . . . ). A distance between the corrugations is determined by Equation 3 and Equation 5. A radius of an mth zone (m=1, 2, 3 . . . ) derived from Equation 3 and Equation 5 can be given by the following Equation (FIG. 4A).

Figure 4A:
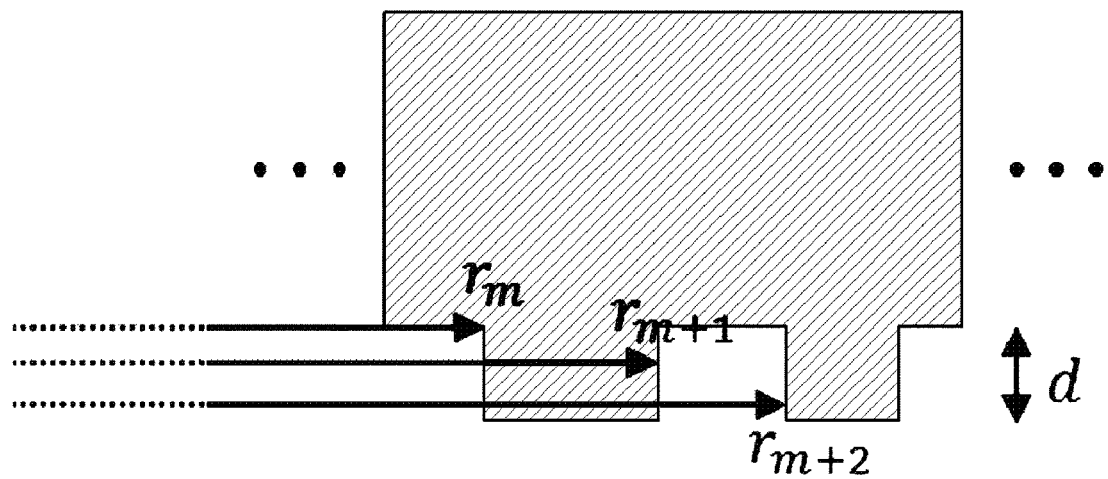
FIGS. 4A and 4B provide enlarged cross-sectional views showing a part of a metasurface.
Figure 4B:
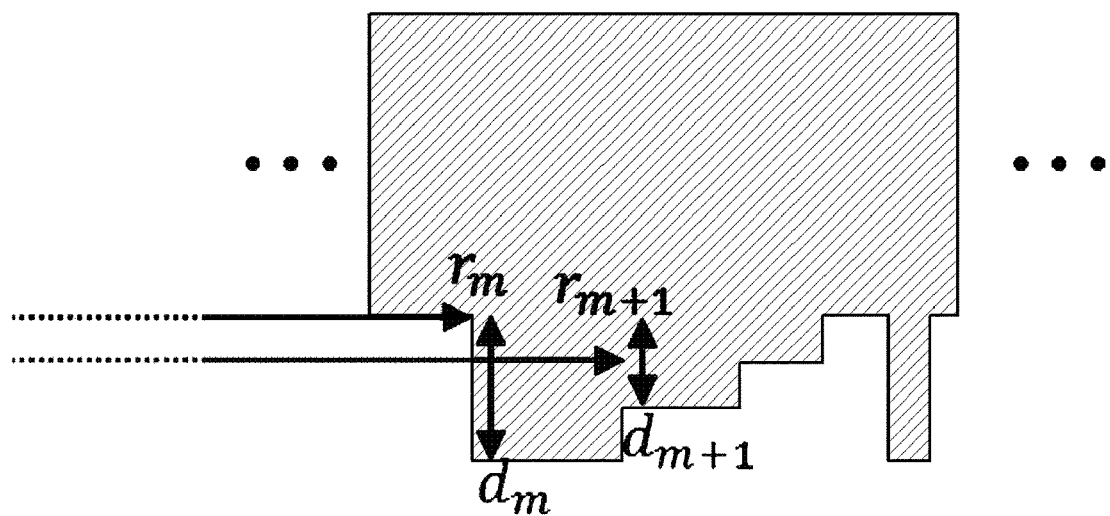

FIGS. 4A and 4B provide enlarged cross-sectional views showing a part of a metasurface in accordance with an embodiment of the present disclosure, FIG. 4A illustrates a part of a structure of a phase-reversing Fresnel zone plate that satisfies $\varphi(r_{m+1})-\varphi(r_m)=a\pi$ and FIG. 4B illustrates a part of a structure of a Fresnel zone plate with a quarter period that satisfies $\varphi(r_{m+1})-\varphi(r_m)=2\pi/l$, and in this case, l is 4.

$$am\pi + \phi_{ref} = \frac{2\pi}{\lambda}(n_1 \pm n_2)\left(\sqrt{r_m^2 + p^2} - p\right), \quad \text{[Equation 7]}$$

$$\therefore r_m = \sqrt{\frac{am + \frac{\phi_{ref}}{\pi}}{n_1 \pm n_2} + \frac{\left(am + \frac{\phi_{ref}}{\pi}\right)^2}{4(n_1 \pm n_2)^2}}$$

(+in the double sign corresponds to the real image case and − to the virtual image case)

Herein, $\Phi_{ref}$ is a reference phase having a value between −aπ and aπ and affects noise near a focus but does not greatly affect principal performance, and to put it simply, it can be 0. In Equation 7, a=1 corresponds to a first-order (or phase-reversing) Fresnel zone plate and a=3, 5, . . . corresponds to a Fresnel zone plate with a second order, third order, and the like. As a Fresnel zone plate has a higher order, a width and a distance of the zones are increased, and, thus, the Fresnel zone plate can be easily manufactured. However, the efficiency of controlling light by the lens is decreased that much and noise is relatively increased. When a depression and a non-depression of the corrugation have heights at which light has a phase difference of half wavelength when passing through the depression and the non-depression, the efficiency can be maximized. The corrugation may be formed of other materials instead of $n_1$ and $n_2$ materials, but if the corrugation is formed of materials with high refractive index considering etching or the like, an optimum thickness d is as follows.

$$d = \frac{\lambda}{2(n_1 - n_2)} \quad \text{[Equation 8]}$$

Secondly, in a more elaborate design, a plate with various zones having l number of heights (l≥2) can be minutely filled even in case of a=1 (FIG. 4B). In this case, l=1 corresponds to a general phase-reversing Fresnel zone plate and l=4 corresponds to a Fresnel zone plate with a quarter period. A radius of an mth zone for a certain l can also be obtained from Equation 3 and Equation 5.

$$\frac{2m}{l}\pi + \phi_{ref} = \frac{2\pi}{\lambda}(n_1 \pm n_2)\left(\sqrt{r_m^2 + p^2} - p\right),$$

$$\therefore r_m = \sqrt{\frac{\left(\frac{2m}{l} + \frac{\phi_{ref}}{\pi}\right)p}{n_1 \pm n_2} + \frac{a^2\left(\frac{2m}{l} + \frac{\phi_{ref}}{\pi}\right)^2}{4(n_1 \pm n_2)^2}}$$

(+in the double sign corresponds to the real image case and − to the virtual image case)

Herein, an optimum thickness d for the mth zone is as follows.

$$d_m = \frac{\lambda}{(n_1 - n_2)}\left(1 - \frac{\text{mod}(m-1, l) + 1}{l}\right)$$

FIG. 4B illustrates a Fresnel zone plate with a quarter period, i.e., l=4, and illustrates the case where m satisfies mod(m−1,l)-0. In case of l→∞, the Fresnel zone plate converges to a Fresnel lens.

Design of Planar Metalens To Flatten Image Plane

If an objective lens has a non-planar image plane with a bend, an image of an object is focused only on a narrow area around the center when the object is observed with a microscope, and, thus, recently, most of objective lenses have been designed to have as planar image plane as possible. A planar metalens can also have a planar image plane by properly designing two planar metalenses having different image planes with bends. Some examples for manufacturing a planar image plane are shown in FIGS. 5A-5D.

FIGS. 5A-5D provide schematic diagrams illustrating combinations of planar metalenses that implement a planar image plane in accordance with an embodiment of the present disclosure, FIG. 5A shows the case where a first lens is a virtual imaging lens and a second lens is a real imaging lens with $n_1 > n_2 > n_3 = 1$, FIG. 5B shows the case where a first lens is a real imaging lens and a second lens is a virtual imaging lens with $n_1 > n_2 > n_3 = 1$, and FIG. 5C and FIG. 5D are schematic diagrams illustrating the case where a first lens is a virtual imaging lens and a second lens is a real imaging lens with $n_2 = 1$ and $n_1 > n_3 > n_2$. A metasurface is located between $n_1$ and $n_2$ and between $n_2$ and $n_3$.

FIG. 5A and FIG. 5B show the case where an intermediate layer having a refractive index of $n_2$ and satisfying $n_1 > n_2 > n_3 = 1$ is placed above a conventional single-layer planar metalens. Herein, f represents a focal length of an objective lens. In this case, a planar metalens (real imaging lens) that focuses a real image and a planar metalens (virtual imaging lens) that focuses a virtual lens have bends on the opposite image planes, and, thus, a planar image plane can be manufactured using properly designed real imaging lens and virtual imaging lens only once. FIG. 5A shows the case where a virtual imaging lens is used between $n_1$ and $n_2$ (a first lens) and a real imaging lens is used between $n_2$ and $n_3$ (a second lens).

FIG. 5C shows the case of $n_2 = 1$ and $n_2 < n_3 < n_1$. In this case, since $n_2$ is smaller than $n_3$, if a second lens is a virtual imaging lens, the second lens has a bend on an image plane opposite to that of the virtual imaging lens (second lens) illustrated in FIG. 5B. Therefore, if a first lens is a virtual imaging lens, a real imaging lens and a virtual imaging lens can serve as a second lens for flattening an image plane, and if a first lens is a real imaging lens, a second lens for flattening an image plane does not exist. However, if a first lens is a virtual imaging lens and a second lens is also a virtual imaging lens, a focal length of the second lens needs to be shorter than a focal length of the first lens on the assumption that a refractive index $n_3$ of the second lens is 1.5, and, thus, it is impossible to achieve physical implementation.

Therefore, FIG. 5C shows the case where a first lens is a virtual imaging lens and a second lens is a real imaging lens. In this case, a focal length of the second lens needs to be two to three times longer than that of the first lens on the assumption that a refractive index $n_3$ of the second lens is 1.5, but the focal length of the second lens is remarkably decreased as compared with FIG. 5A, and, thus, the second lens can be relatively easily manufactured. Further, the first lens and the second lens have an appropriate minimum linewidth of 100 nm or more.

FIG. 5C shows an example of simple implementation where a second lens is brought into contact with a conventional objective lens. FIG. 5D shows an example of manufacturing an objective lens including a second lens. In addition to the above-described examples of a planar metalens, a planar metalens can be implemented as long as a distance between a first lens and a second lens and a distance between the second lens and an objective lens are determined depending on lens design and the first lens, the second lens, and the objective lens are spatially fixed accordingly.

Example of Actual Design of Planar Metalens

Figure 6A:
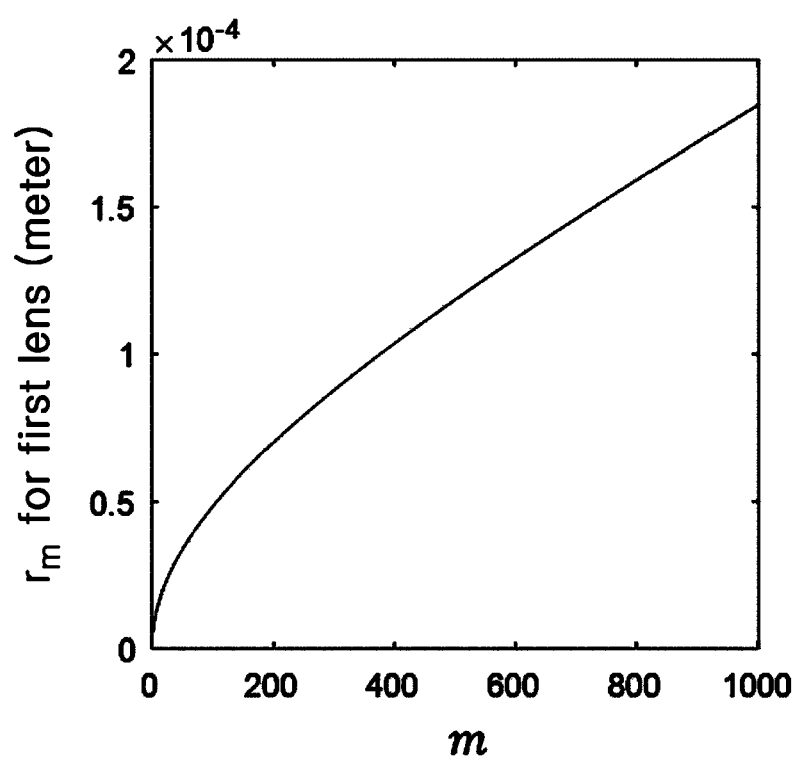
FIGS. 6A and 6B are graphs for a radius $r_m$ of an $m^{th}$ zone of an internal Fresnel zone plate in a planar metalens designed using the structure illustrated in FIG. 5C.
Figure 6B:
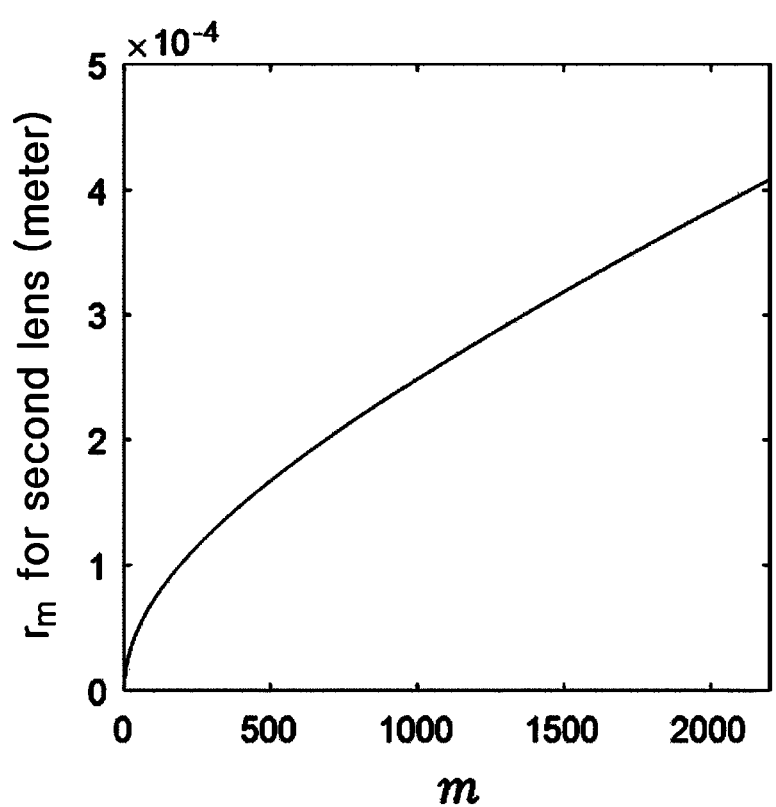

FIGS. 6A and 6B are graphs for a radius $r_m$ of an mth zone of an internal Fresnel zone plate in a planar metalens designed using the structure illustrated in FIG. 5C and FIG. 5D.

A wavelength was set to about 543 nm, a refractive index $n_1$ of the first lens to 3.468, a refractive index $n_2$ of air to 1, a refractive index $n_3$ of the second lens to 1.519, a focal length of the first lens to about 100 μm, and a focal length of the second lens to about 233 μm. A radius $r_m$ of an mth Fresnel zone plate of the first lens and a radius $r_m$ of an mth Fresnel zone plate of the second lens are as shown in FIG. 6A and FIG. 6B, respectively. A maximum value of m for the first lens and the second lens was selected high enough to concentrate light proceeding at about 60 degrees (in this case, a numerical aperture NA of the optical system is 3.468(60°)=3). A thickness of an corrugation of the first lens is about 100 nm and a thickness of an corrugation of the second lens is about 150 nm. In this case, it is possible to implement a planar metalens having a resolution of about 100 nm, a field of view of about 16 μm in diameter, and a planar image plane (Details thereof will be described in the following result analysis).

Analysis of Performance of Planar Metalens

FIGS. 7A-7G provide the results of simulations showing performance of a planar metalens.

Figure 7A:
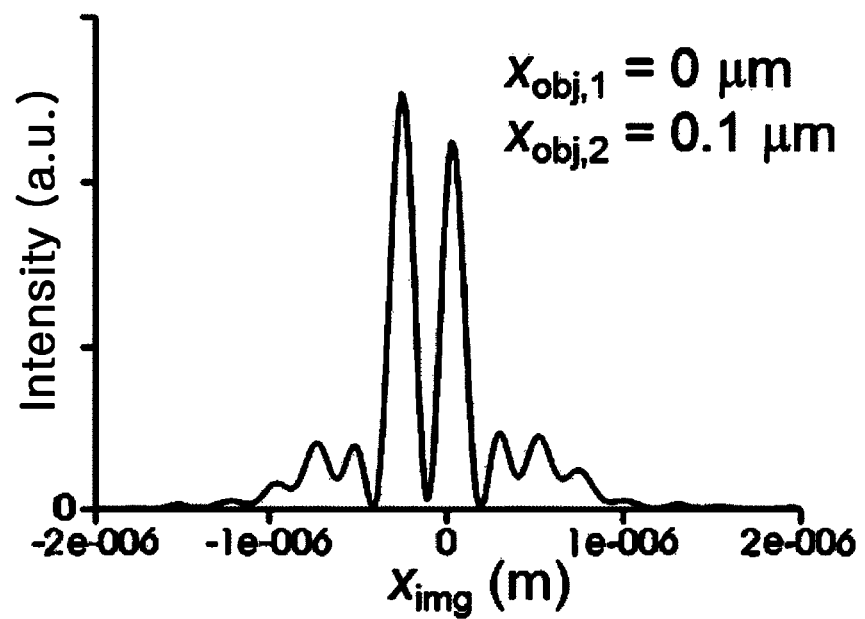
FIGS. 7A, 7B, 7C, 7D, 7E, 7F and 7G provide the results of simulations showing performance of a planar metalens.
Figure 7B:
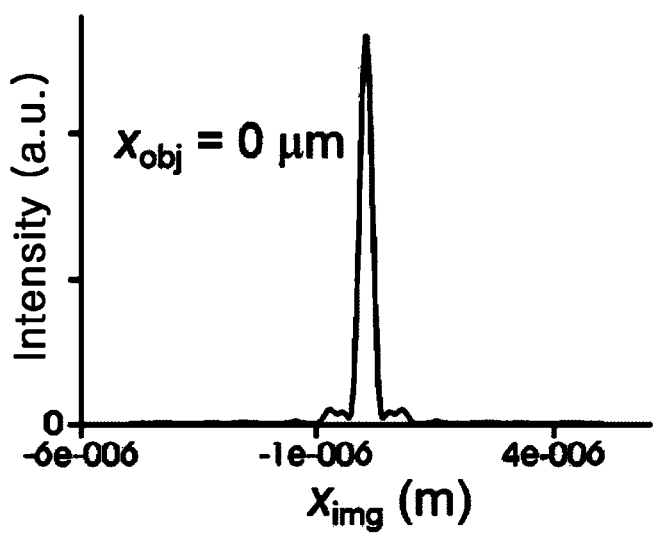
Figure 7C:
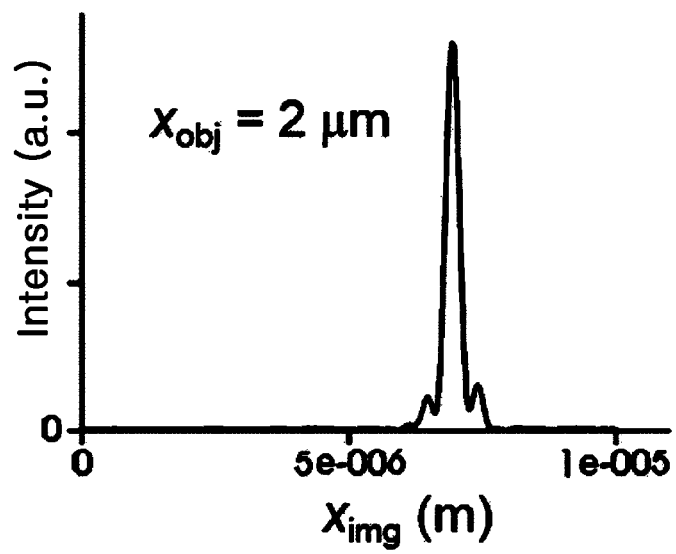
Figure 7D:
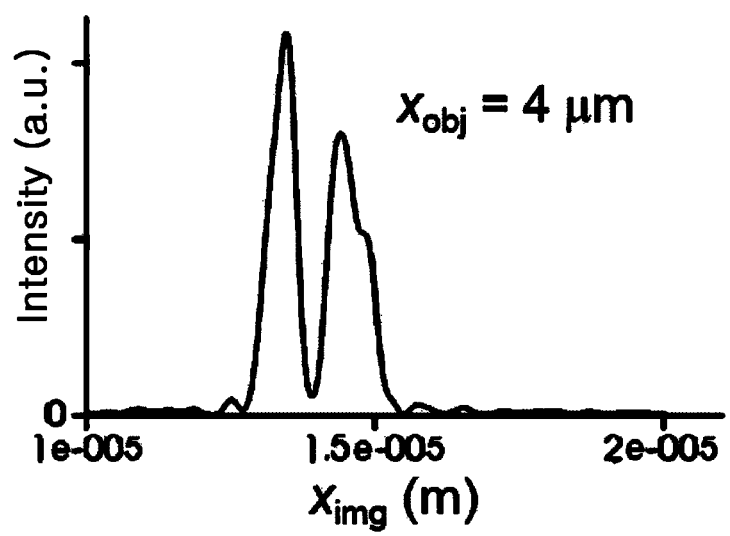

Referring to a graph in FIG. 7A, it can be seen that when a planar metalens was simulated using the design illustrated in FIGS. 6A and 6B, two point light sources spaced by 100 nm from an objective plane were separately shown on an image plane. FIGS. 7B-7D show changes in image depending on locations of the point light sources from the objective plane when only a first lens of the design illustrated in FIGS. 6A and 6B was used. It can be seen that when the point light sources are spaced by about 2 μm from the origin of the objective plane, an image was formed without distortion (FIG. 7C). It can be seen that when the point light sources are spaced by about 4 μm from the origin of the objective plane, separated images were formed (FIG. 7D).

Figure 7E:
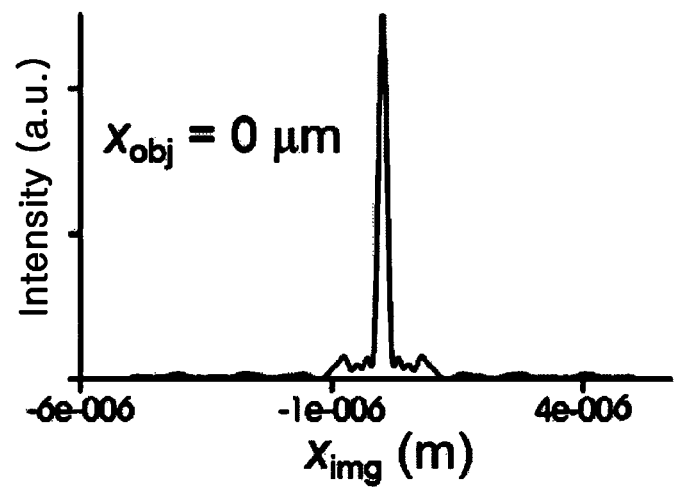
Figure 7F:
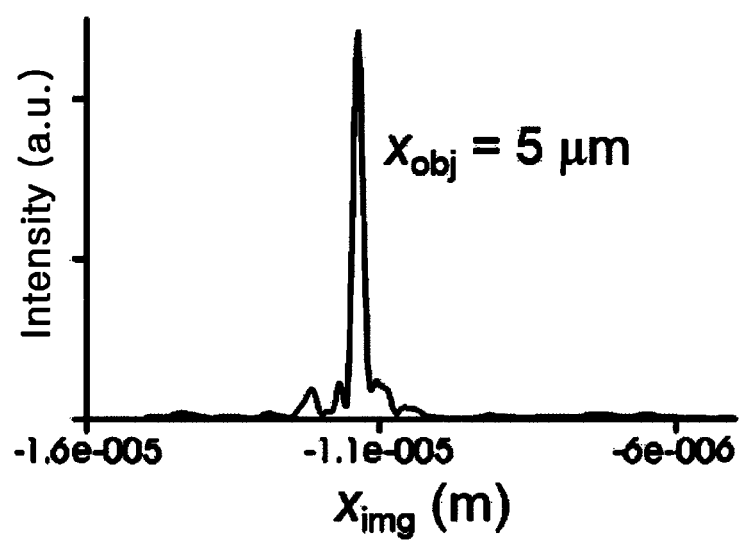
Figure 7G:
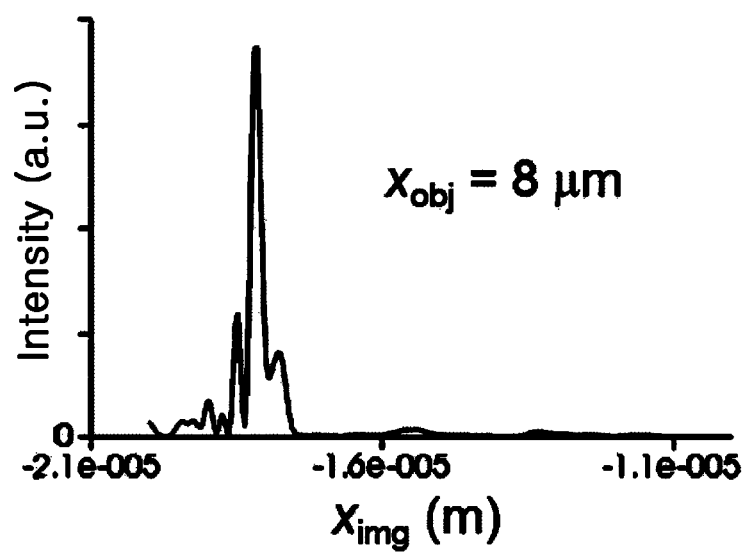

FIGS. 7E-7G show changes in image depending on locations of the point light sources from the objective plane when the planar metalens designed as shown in FIGS. 6A and 6B includes both a first lens and a second lens. In the case where the point light sources are spaced by about 8 μm from the origin of the objective plane, an image does not have severe distortion (FIG. 7G). Therefore, it can be seen that a planar image plane was implemented and a field of view of about 16 μm in diameter could be secured.

We claim:

1. A planar metalens comprising a first lens, the first lens comprising:
a first planar substrate on one side of which a subject is located, and
a first metasurface configured on the other side of the first planar substrate,
wherein a refractive index $n_1$ of the first lens, and a refractive index $n_2$ of an air layer present between the first lens and an image plane of the subject have a correlation of $n_1 > n_2$,
wherein the first metasurface comprises a diffraction lattice, and
wherein Equation 3 describes formation of a real image from the metalens, and Equation 5 describes formation of a virtual image from the metalens:

$$\phi(r) = -\frac{2\pi}{\lambda}(n_1 + n_2)(\sqrt{r^2 + p^2} - p); \quad \text{[Equation 3]}$$

$$\phi(r) = -\frac{2\pi}{\lambda}(n_1 - n_2)(\sqrt{r^2 + p^2} - p); \quad \text{[Equation 5]}$$

wherein p is a distance between the subject and the metasurface,
Φ(r) is a phase applied to light from the metasurface spaced with a distance r from an origin of the first metasurface, and
λ is a wavelength of light transmitting.

2. The planar metalens of claim 1,
wherein the first lens includes a material having high refractive index, the material selected from the group consisting of GaP, Si, glass, $SiO_2$, $TiO_2$, ZnO, $Al_2O_3$, AlN, $Si_3N_4$, Ge, $ZrO_2$, SiC, and combinations thereof.

3. The planar metalens of claim 1,
wherein the first metasurface is formed by etching the first planar substrate or by being attached on one side of the first planar substrate.

4. The planar metalens of claim 1,
wherein a wavelength of light transmitting through the planar metalens is in a range of ultraviolet, visible light, infrared, or near-infrared.

5. The planar metalens of claim 1, further comprising a second lens,
wherein the second lens comprises:
a second planar substrate contacted to the first metasurface on one side thereof, and
a second metasurface configured on the other side of the second planar substrate.

6. The planar metalens of claim 5,
wherein a refractive index $n_1$ of the first lens, a refractive index $n_2$ of the second lens, and a refractive index $n_3$ of an air layer present between the second lens and an image plane of the subject have a correlation of $n_1 > n_2 > n_3$.

7. The planar metalens of claim 5,
wherein the first lens includes a material with high refractive index, the material selected from the group consisting of GaP, Si, glass, $SiO_2$, $TiO_2$, ZnO, $Al_2O_3$, AlN, $Si_3N_4$, Ge, $ZrO_2$, SiC, and combinations thereof, and
wherein the second lens includes a material selected from the group consisting of polystyrenes, polycarbonates, polymethylmethacrylates, silica aerogel, GaP, Si, glass, $SiO_2$, $TiO_2$, ZnO, $Al_2O_3$, AlN, $Si_3N_4$, Ge, $ZrO_2$, SiC, and combinations thereof.

8. The planar metalens of claim 5,
wherein each of the first lens and the second lens independently includes one or more corrugations.

9. The planar metalens of claim 5,
wherein each of the first metasurface and the second metasurface independently comprises a diffraction lattice.

10. The planar metalens of claim 5,
wherein the first metasurface and the second metasurface are independently formed by etching the first planar substrate and the second planar substrate, respectively, or by being attached on one side of the first planar substrate and the second planar substrate, respectively.

11. The planar metalens of claim 5,
wherein a wavelength of light transmitting through the planar metalens is in a range of ultraviolet, visible light, infrared, or near-infrared.

12. The planar metalens of claim 1, further comprising a second lens and an air layer,
wherein the second lens comprises:
a second planar substrate configured apart from the first metasurface, and
a second metasurface configured on one side of the second planar substrate; and,
wherein the air layer is present between the first lens and the second lens.

13. The planar metalens of claim 12,
wherein a refractive index $n_1$ of the first lens, a refractive index $n_2$ of the air layer, and a refractive index $n_3$ of the second lens have a correlation of $n_1 > n_3 > n_2$.

14. The planar metalens of claim 12,
wherein the first lens includes a material having high refractive index, the material selected from the group consisting of GaP, Si, glass, $SiO_2$, $TiO_2$, ZnO, $Al_2O_3$, AlN, $Si_3N_4$, Ge, $ZrO_2$, SiC, and combinations thereof, and
wherein the second lens includes a material selected from the group consisting of polystyrenes, polycarbonates, polymethylmethacrylates, silica aerogel, GaP, Si, glass, $SiO_2$, $TiO_2$, ZnO, $Al_2O_3$, AlN, $Si_3N_4$, Ge, $ZrO_2$, SiC, and combinations thereof.

15. The planar metalens of claim 12,
wherein each of the first metasurface and the second metasurface independently comprises a diffraction lattice.

16. The planar metalens of claim 12,
wherein the first metasurface and the second metasurface are formed by etching the first planar substrate and the second planar substrate, respectively, or by being attached on one side of the first planar substrate and the second planar substrate, respectively.

17. The planar metalens of claim 12,
wherein a wavelength of light transmitting through the planar metalens is in a range of ultraviolet, visible light, infrared, or near-infrared.

18. A cover glass, comprising the planar metalens according to claim 1.

* * * * *